(12) United States Patent
Takeda et al.

(10) Patent No.: US 9,383,491 B2
(45) Date of Patent: Jul. 5, 2016

(54) RETARDATION FILM, POLARIZING PLATE, AND LIQUID CRYSTAL DISPLAY

(71) Applicant: FUJIFILM Corporation, Tokyo (JP)

(72) Inventors: Jun Takeda, Kanagawa (JP); Shunya Katoh, Kanagawa (JP); Michio Nagai, Kanagawa (JP); Yoji Ito, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 61 days.

(21) Appl. No.: 14/325,875

(22) Filed: Jul. 8, 2014

(65) Prior Publication Data

US 2015/0029445 A1 Jan. 29, 2015

(30) Foreign Application Priority Data

Jul. 25, 2013 (JP) .................................. 2013-154641
May 28, 2014 (JP) .................................. 2014-109781

(51) Int. Cl.
*C09K 19/00* (2006.01)
*G02B 5/30* (2006.01)
*G02F 1/13363* (2006.01)

(52) U.S. Cl.
CPC .......... *G02B 5/3016* (2013.01); *G02F 1/13363* (2013.01); *G02F 2001/133633* (2013.01); *Y10T 428/10* (2015.01); *Y10T 428/105* (2015.01); *Y10T 428/1036* (2015.01)

(58) Field of Classification Search
CPC ...... G02B 5/30; G02B 5/3016; G02B 5/3083; G02B 5/32; B32B 2457/20; B32B 2457/202; B32B 2305/55; G02F 1/13363; G02F 1/133634; G02F 2001/133638; G02F 2202/40

USPC ............. 428/1.1, 1.3, 1.33, 1.5, 1.54; 349/96, 349/117–119
See application file for complete search history.

(56) References Cited

U.S. PATENT DOCUMENTS

| 2009/0180059 A1* | 7/2009 | Fukuda et al. ................... 349/96 |
| 2010/0149638 A1* | 6/2010 | Kashima et al. .............. 359/500 |
| 2012/0314159 A1 | 12/2012 | Sakai |

FOREIGN PATENT DOCUMENTS

| JP | 2006215221 A | * | 8/2006 |
| JP | 2009-086260 A | | 4/2009 |
| JP | 2012-255926 A | | 12/2012 |

\* cited by examiner

*Primary Examiner* — Ruiyun Zhang
(74) *Attorney, Agent, or Firm* — Jean C. Edwards, Esq.; Edwards Neils LLC

(57) ABSTRACT

A retardation film includes a first optically anisotropic layer having liquid crystal compounds fixed in a homogeneously aligned state and a leveling agent, and having an order parameter of 0.75 to 0.95 and a thickness of 0.3 to 3.0 μm; an intermediate layer including a resin having a solubility parameter SP value of 21.5 to 24.7, calculated by Hoy's method, the intermediate layer having a thickness of 3.0 μm or less; and a second optically anisotropic layer having liquid crystal compounds fixed in a homeotropically aligned state, and having an order parameter OP of 0.6 to 0.95 and a thickness of 0.3 to 3.0 μm, wherein OP is represented by the following equation; $OP=(A_\parallel - A_\perp)/(2A_\perp + A_\parallel)$ where $A_\parallel$ is absorbance of the liquid crystal compounds for light polarized parallel to an alignment direction, and $A_\perp$ is absorbance of the liquid crystal compounds for light polarized perpendicular to the alignment direction.

19 Claims, 2 Drawing Sheets

RETARDATION FILM, POLARIZING PLATE, AND LIQUID CRYSTAL DISPLAY

CROSS-REFERENCE TO RELATED APPLICATIONS

The present application claims the benefit of priority from Japanese Patent Application No. 2013-154641, filed on Jul. 25, 2013, and Japanese Patent Application No. 2014-109781, filed on May 28, 2014, the contents of all of which are herein incorporated by reference in their entirety.

BACKGROUND OF THE INVENTION

1. Field of the Invention

The present invention relates to retardation films and also relates to polarizing plates and liquid crystal displays including retardation films.

2. Description of the Related Art

Recently, tablets and other mobile devices have been widely used which include liquid crystal displays working in an in-place-switching (IPS) mode. Examples of optical films under research for use in tablets and other mobile devices include those including an optically anisotropic layer that exploits the orientation of a liquid crystal compound. Specifically, Japanese Unexamined Patent Application Publication No. 2009-86260 discloses a retardation film including a transparent substrate, an optically anisotropic layer on one surface of the transparent substrate, and a retardation layer on the other surface of the transparent substrate (see, for example, FIG. 1 of this reference).

The needs for lower profiles on tablets and other mobile devices are increasing the demands for thinner retardation films used in IPS-mode liquid crystal displays. One known technique for fabrication of thinner retardation films is disclosed in Japanese Unexamined Patent Application Publication No. 2012-255926. Specifically, this reference discloses a retardation film including a positive C-plate and a positive A-plate or optically biaxial plate that are laminated together in direct contact without an adhesive therebetween.

SUMMARY OF THE INVENTION

The retardation film disclosed in Japanese Unexamined Patent Application Publication No. 2009-86260 is not infrequently thick, for the transparent substrate has an optically anisotropic layer on one surface thereof and a retardation layer on the other surface thereof. The inventors, who has replicated the retardation film disclosed in Japanese Unexamined Patent Application Publication No. 2012-255926, have confirmed that the film tends to compensate for the optical characteristics of a polarizing plate (i.e., reduce light leakage within a viewing angle) more effectively than that without a retardation film. Unfortunately, this retardation film exhibits a considerably lower front contrast than compensation films having thicknesses of about 100 μm that are currently available in the market.

Another approach is to provide an alignment film containing polyvinyl alcohol (PVA) between first and second optically anisotropic layers. To form an alignment film containing PVA, an aqueous PVA composition is generally applied. The resulting coating, however, may suffer from defects due to repulsion on the first optically anisotropic layer because of a difference in hydrophilicity or hydrophobicity between the aqueous composition and a leveling agent contained in the first optically anisotropic layer. Thus, a thinner coating has more defects, which makes it difficult to form a uniform coating.

In addition, PVA alignment films are significantly insoluble in nonaqueous solvents; therefore, it is difficult to form a thin uniform PVA alignment film between the first and second optically anisotropic layers. A thick PVA alignment film may separate with heat and is also disadvantageous for fabrication of thinner optical films.

In view of the foregoing problems, an object of the present invention is to provide a retardation film including first and second optically anisotropic layers and a thin intermediate layer therebetween and having high adhesion, high storage stability in hot and humid environments, and high liquid crystal display performance. Another object of the present invention is to provide a polarizing plate and a liquid crystal display including such a retardation film.

After intensive research on the foregoing problems, the inventors have found that the foregoing problems can be solved by disposing in sequence, a first optically anisotropic layer containing a leveling agent and having an order parameter within a particular range and a thickness within a particular range, an intermediate layer containing a particular resin, and a second optically anisotropic layer having an order parameter within a particular range and a thickness within a particular range, the first optically anisotropic layer, the intermediate layer and the second optically anisotropic layer are adjacent to each other. Specifically, the problems were solved by the configuration <1>, preferably by configurations <2> to <20> below.

<1> A retardation film comprising, in sequence;

a first optically anisotropic layer comprising liquid crystal compounds fixed in a homogeneously aligned state and a leveling agent, the first optically anisotropic layer having an order parameter of 0.75 to 0.95 and having a thickness of 0.3 to 3.0 μm;

an intermediate layer comprising a resin having an SP value of 21.5 to 24.7, where the SP value is a solubility parameter calculated by Hoy's method, the intermediate layer having a thickness of 3.0 μm or less; and a second optically anisotropic layer comprising liquid crystal compounds fixed in a homeotropically aligned state, the second optically anisotropic layer having an order parameter of 0.6 to 0.95 and having a thickness of 0.3 to 3.0 μm, wherein the order parameter OP is represented by the following equation;

$$OP=(A_{\parallel}-A_{\perp})/(2A_{\perp}+A_{\parallel})$$

where $A_{\parallel}$ is absorbance of the liquid crystal compounds for light polarized parallel to an alignment direction, and $A_{\perp}$ is absorbance of the liquid crystal compounds for light polarized perpendicular to the alignment direction;

the first optically anisotropic layer, the intermediate layer and the second optically anisotropic layer are adjacent to each other.

<2> The retardation film according to <1>, wherein the resin having an SP value of 21.5 to 24.7 is a (meth)acrylic resin.

<3> The retardation film according to <1>, wherein the resin having an SP value of 21.5 to 24.7 is a (meth)acrylic resin having a polymerizable group.

<4> The retardation film according to any one of <1> to <3>, wherein the leveling agent has a molecular weight of 500 to 2,000.

<5> The retardation film according to any one of <1> to <4>, wherein the leveling agent comprises fluorine and/or silicon.

<6> The retardation film according to any one of <1> to <5>, wherein the first optically anisotropic layer exhibits a smectic phase.
<7> The retardation film according to any one of <1> to <6>, wherein the second optically anisotropic layer exhibits a nematic phase.
<8> The retardation film according to any one of <1> to <7>, wherein the first optically anisotropic layer satisfies inequalities (1) and (2);

$$100 \text{ nm} \leq Re(550) \leq 200 \text{ nm} \quad (1)$$

$$0.8 \text{ nm} \leq Nz \leq 1.2 \text{ nm} \quad (2)$$

where Re(550) is the retardation in a plane at a wavelength of 550 nm, Nz is (nx−nz)/(nx−ny), nx is the refractive index in a slow axis direction in a plane, ny is the refractive index in a direction perpendicular to nx in a plane, and nz is the refractive index in a direction perpendicular to nx and ny.
<9> The retardation film according to any one of <1> to <8>, wherein the first optically anisotropic layer satisfies inequality (3);

$$Re(450)/Re(650)<1 \quad (3)$$

where Re(450) is the retardation in a plane at a wavelength of 450 nm, and Re(650) is the retardation in a plane at a wavelength of 650 nm.
<10> The retardation film according to any one of <1> to <9>, wherein the second optically anisotropic layer further comprises a vertical alignment agent.
<11> The retardation film according to any one of <1> to <10>, which has a thickness of 0.6 to 10 μm.
<12> The retardation film according to any one of <1> to <11>, wherein each of the liquid crystal compounds contained in the first and second optically anisotropic layers is a rod-like liquid crystal compound.
<13> The retardation film according to any one of <1> to <12>, further comprising;
  a support; and
  an alignment film, the alignment film, the first optically anisotropic layer, the intermediate layer, and the second optically anisotropic layer, disposed in sequence on the support.
<14> A polarizing plate comprising;
  a polarizing film; and
  the retardation film according to any one of <1> to <13>.
<15> The polarizing plate according to <14>, wherein the first optically anisotropic layer is disposed on the surface of the polarizing film.
<16> A liquid crystal display comprising the retardation film according to any one of <1> to <13> or the polarizing plate according to <14> or <15>.
<17> The liquid crystal display according to <16>, wherein the liquid crystal display is an in-place-switching (IPS) mode liquid crystal display.
<18> The liquid crystal display according to <16> or <17>, wherein the liquid crystal display comprises the polarizing plate according to <14> or <15>, the polarizing plate disposed in the front of the liquid crystal display.
<19> The liquid crystal display according to <18>, further comprising;
  a rear polarizing film;
  a liquid crystal cell; and
  a rear optical film disposed between the rear polarizing film and the liquid crystal cell, the rear optical film having a retardation Re(550) in a plane at a wavelength of 550 nm of 30 to 120 nm and a retardation Rth(550) across the thickness at a wavelength of 550 nm of 20 to 100 nm.
<20> The liquid crystal display according to <19>, wherein the rear optical film comprises an optically anisotropic layer comprising an obliquely aligned liquid crystal compound.

According to the present invention, a retardation film including first and second optically anisotropic layers and a thin intermediate layer therebetween and having high adhesion, high storage stability in hot and humid environments, and high display performance can be provided. A polarizing plate and a liquid crystal display including such a retardation film can also be provided.

DESCRIPTION OF THE PREFERRED EMBODIMENTS

Figure 1:
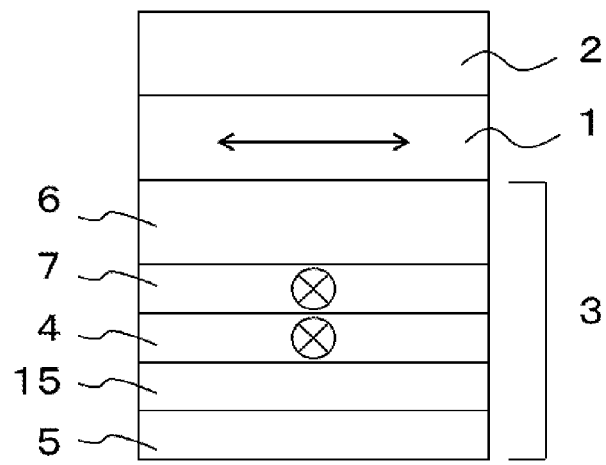
FIG. 1 is a schematic view illustrating an example retardation film according to the present invention.

The contents of the invention are described in detail hereinunder. In this description, the numerical range expressed by the wording "a number to another number" means the range that falls between the former number indicating the lowermost limit of the range and the latter number indicating the uppermost limit thereof. In addition, throughout the specification, numerical ranges and numerical values should be construed as ones including errors generally acceptable in the field of the invention.

The relationships between the optical axes shown herein may contain an error acceptable in the technical field to which the present invention pertains. The terms "parallel", "perpendicular", and "vertical" as used herein encompass angles within the exact angle ±5°. The deviation from the exact angle is preferably less than ±4°, more preferably less than ±3°.

A retardation film according to the present invention includes, disposed in sequence, a first optically anisotropic layer, an intermediate layer, and a second optically anisotropic layer, wherein the first optically anisotropic layer, the intermediate layer and the second optically anisotropic layer are adjacent to each other. The first optically anisotropic layer contains liquid crystal compounds fixed in a homogeneously aligned state and a leveling agent and has an order parameter of 0.75 to 0.95 and a thickness of 0.3 to 3.0 μm. The intermediate layer contains a resin having an SP value of 21.5 to 24.7 and has a thickness of 3.0 μm or less. The second optically anisotropic layer contains liquid crystal compounds fixed in a homeotropically aligned state and has an order parameter of 0.6 to 0.95 and a thickness of 0.3 to 3.0 μm.

The retardation film having such a configuration is thin and provides high front contrast when incorporated into a liquid crystal display. Japanese Unexamined Patent Application Publication No. 2012-255926, described above, discloses a retardation film including a first optically anisotropic layer and a second optically anisotropic layer disposed on a surface thereof. Research conducted by the inventors, however, shows that the retardation film disclosed in Example 1 of this reference may have insufficient front contrast. Further research shows that the low contrast is caused by disorder in the alignment of the positive C-plate. Specifically, the alignment of liquid crystal compounds is known to be affected to the underlying substrate. A layer formed by directly applying a coating solution containing liquid crystal compounds onto a surface of a positive A-plate using a known technique, as disclosed in this reference, is influenced by the underlying substrate, i.e., the positive A-plate. This results in disorder in the alignment of the liquid crystal compound in the interface between the positive A-plate and the layer formed by directly applying the coating solution containing the liquid crystal compound. Thus, the optically anisotropic layer (positive C-plate) disposed on the surface of the positive A-plate cannot achieve a desired order parameter. In addition, the liquid crystal compound disclosed in the above reference exhibits a lower front contrast because the positive A-plate is nematic and thus essentially has a low order parameter, i.e., about 0.7.

In the present invention, to solve this problem, both the liquid crystal compound in the first optically anisotropic layer and the liquid crystal compound in the second optically anisotropic layer are aligned with a high degree of orientational order. Specifically, the leveling agent contained in the first optically anisotropic layer, in which the liquid crystal compound is fixed in a homogeneously aligned state with a high degree of order, forms a smooth surface on the first optically anisotropic layer, thus allowing a thin intermediate layer to be formed on the surface thereof. As a result, the liquid crystal compound in the second optically anisotropic layer disposed on the surface of the intermediate layer can be homeotropically aligned with a high degree of order.

In the present invention, the degree of orientational order of the liquid crystal compounds for the first and second optically anisotropic layers is defined by the order parameter. The order parameter will now be described. An optical element needs to be aligned to induce optical anisotropy. The term "optical element" as used herein refers to an optical element that induces anisotropic refractive index. Examples of optical elements include discotic or rod-like liquid crystal molecules, which exhibit a liquid crystal phase within a predetermined temperature range, and polymers aligned by processes such as stretching. The bulk birefringence of an optical material is determined by the intrinsic birefringence of an optical element and the statistical degree of alignment of the optical element. For example, the magnitude of the optical anisotropy of an optically anisotropic layer made of liquid crystal compounds is determined by the intrinsic birefringence of the liquid crystal compounds, which is an optical element mainly responsible for inducing optically anisotropy, and the statistical degree of alignment of the liquid crystal compounds. The order parameter S is known as a parameter representing the degree of alignment. A material having no distribution, such as liquid crystal, has an order parameter of 1, whereas a completely randomly oriented material, such as a liquid, has an order parameter of 0. For example, nematic liquid crystal typically has an order parameter of about 0.6. The order parameter S is discussed in detail, for example, in DE JEU, W. H., "Physical Properties of Liquid Crystals" (Ekisho No Bussei) (Kyoritsu Shuppan Co., Ltd. 1991, page 11) and is represented by the following equation;

$$S = \frac{1}{2} \langle 3\cos^2\theta - 1 \rangle$$

where θ is the angle between the average alignment axis direction of alignment elements and the axis of each alignment element.

Examples of known techniques for measuring the order parameter include polarized Raman spectroscopy, IR spectroscopy, X-ray spectroscopy, fluorescence spectroscopy, and sound velocity measurement.

The order parameter of a dichroic optically anisotropic layer can be relatively readily determined by the following equation;

$$OP = (A_\| - A_\perp)/(2A_\perp + A_\|)$$

where $A_\|$ is absorbance of the liquid crystal compounds for light polarized parallel to the alignment direction, and $A_\perp$ is absorbance of the liquid crystal compounds for light polarized perpendicular to the alignment direction.

The order parameter is known to be a measure indicating the degree of orientational order of a liquid crystal compound, for example, as discussed in "Technologies & Applications of Liquid Crystal Polymers" (CMC Publishing Co., Ltd.), page 5, and Japanese Unexamined Patent Application Publication No. 2008-297210.

An order parameter closer to 1 indicates that liquid crystal molecules are more regularly arranged. In other words, an order parameter closer to 1 indicates higher crystallinity. The maximum order parameter indicating liquid crystallinity is practically about 0.95; therefore, the upper limit of the first and second optically anisotropic layers in the present invention is set to 0.95.

In the present invention, the absorbance is determined by the following relationship;

$$\text{Absorbance} = 1 - \text{transmittance}$$

A specific method for measuring the order parameter in the present invention is as follows.

Liquid crystal compounds into which a dichroic dye are addare applied to a rubbed alignment film to form a thin liquid crystal film. The liquid crystal film is dried and is cured with ultraviolet radiation. The polarization direction of light incident on a spectrometer is fixed perpendicular to the cured liquid crystal film. The spectra of the thin liquid crystal film for light polarized perpendicular to the alignment direction and for light polarized parallel to the alignment direction are measured. The polarized absorption spectrum (absorbance) of quartz glass is also measured and is subtracted from the measured spectrum to determine $A_\perp$ and $A_\|$, which are substituted into the above equation for the order parameter.

The inventors have found that the order parameter correlates strongly with the degrees of depolarization in the front and tilted directions of a retardation film disposed between two polarizing plates in a crossed nicol state.

The degree of depolarization is closely related to the contrast of a retardation film incorporated into a liquid crystal display, and there is a need for a lower degree of depolarization in the market. The degree of depolarization varies not only with the scattering properties of the film, but also between the slow axis and the polarization axis of the film. If a liquid crystal has a low order parameter, the liquid crystal molecules cause slight orientational fluctuations, which can lead to light scattering and thus decrease the degree of depolarization. The degree of depolarization is preferably 0.000080 or less, more preferably 0.000025 or less, even more preferably 0.000024 or less, further preferably 0.000022 or less. A retardation film having such a degree of depolarization provides the advantages of the present invention more effectively. The degree of depolarization D is represented by the following equation;

$$D = L\min/L\max - L_0\min/L_0\max$$

where Lmin is the minimum luminance of light passing through a retardation compensation film disposed between two polarizing plates in a crossed nicol state; Lmax is the maximum luminance of light passing through a retardation film disposed between two polarizing plates in a parallel nicol state; $L_0$ min is the minimum luminance of light passing through two polarizing plates in a crossed nicol state; and $L_0$ max is the maximum luminance of light passing through two polarizing plates in a parallel nicol state.

Research conducted by the inventors on the cause of a variable front contrast in a film containing a high-order-parameter liquid crystal compound shows that the variable front contrast is related to the degree of depolarization of the retardation film. That is, the research shows that a lower degree of depolarization results in improved front contrast. Further research shows that orientational fluctuations in the liquid crystal in a retardation film tend to result in a lower degree of orientational order (order parameter), which intensifies light scattering. The inventors have concluded that an improvement in order parameter reduces the degree of depolarization and thus significantly increases the front contrast of the retardation film according to the present invention when the retardation film is incorporated into a liquid crystal display.

The degree of depolarization of the retardation film according to the present invention in an tilted direction can be reduced, for example, as described above, by forming an optically anisotropic layer with a mixture of two or more particular liquid crystal compounds in a predetermined ratio or compounding a predetermined additive. Alternatively, the degree of depolarization can be reduced, for example, by optimizing the temperature at which the liquid crystal compound is cured in an aligned state by ultraviolet irradiation or the temperature at which the liquid crystal compound is dried in an aligned state. This reduces a decrease in contrast (CR) attributed to light scattering due to orientational fluctuations of the liquid crystal.

Figure 5:
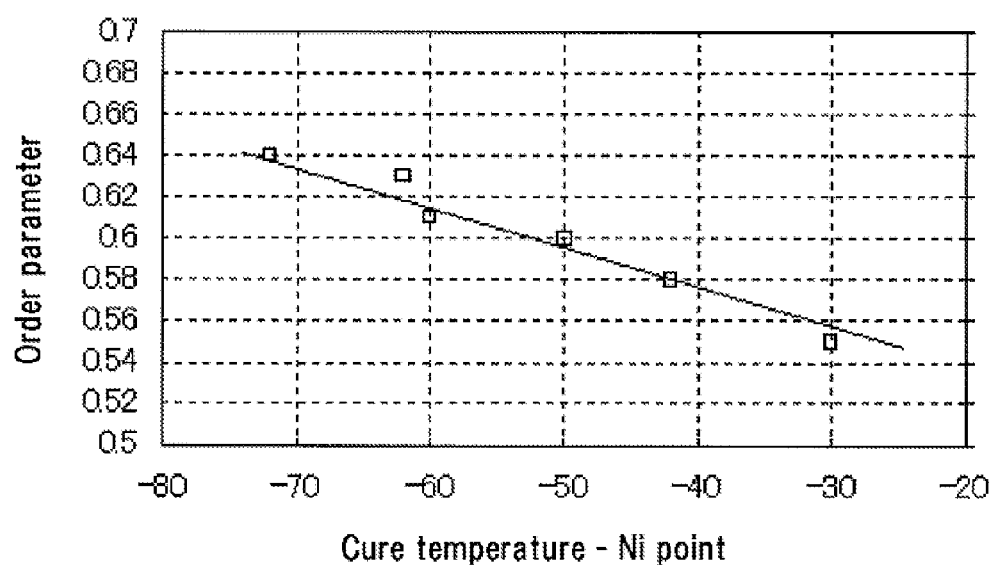
FIG. 5 is a graph showing an example relationship between the order parameter and the nematic-isotropic (N-I) point and curing temperature.

After further research, the inventors have found that, as illustrated in FIG. 5, which shows the case of a C-plate, the order parameter tends to increase as the liquid crystal compound has a higher nematic-isotropic transition temperature (N-I point).

The inventors have also similarly determined the correlation between the order parameter and the temperature at which the liquid crystal compound is cured in an aligned state using liquid crystal compounds having the same NI point. As a result, the inventors have found that the order parameter tends to increase as the temperature at which the liquid crystal compound is cured in an aligned state is decreased.

In general, the haze of a retardation film may be researched as a physical property that affects the front contrast of a liquid crystal display. The haze is expressed by the ratio of the total intensity of light passing through a retardation film to the total intensity of light emitted from a diffusing light source. Research conducted by the inventors shows that the haze does not exactly reflect the difference in front contrast, as shown in Table 1 below. In addition, the measurements obtained with the system used to measure the haze may differ from those obtained with an actual liquid crystal display, in which light emitted from a diffusing light source is polarized through a polarizing plate before it enters the retardation film. In contrast, the degree of depolarization used in the present invention is determined in a system using actual polarized light incident on the optical compensation film and correlates with the front contrast of a liquid crystal display. Thus, the improvement in the measurement system also contributes to the present invention.

Example measurements of the degrees of depolarization of samples prepared with varying N-I points of liquid crystal compounds and ultraviolet curing temperatures is shown below.

TABLE 1

| | Degree of depolarization | Ni temperature | Temperature at which the liquid crystal compound is cured in an aligned state | Haze |
|---|---|---|---|---|
| Sample 1 | 0.000013 | 105° C. | 40° C. | 0.50 |
| Sample 2 | 0.000027 | 95° C. | 80° C. | 0.40 |
| Sample 3 | 0.000025 | 95° C. | 90° C. | 0.31 |

The first optically anisotropic layer, the intermediate layer, and the second optically anisotropic layer will now be described in detail.

First Optically Anisotropic Layer

The first optically anisotropic layer in the present invention contains a liquid crystal compound fixed in a homogeneously aligned state and a leveling agent and has an order parameter of 0.75 to 0.95 and a thickness of 0.3 to 3.0 µm. In terms of manufacture, the first optically anisotropic layer preferably has an order parameter of 0.80 to 0.90, more preferably 0.84 to 0.90. The layer having such an order parameter is preferably a layer of a liquid crystal display fixed in a smectic phase. The method for manufacturing the first optically anisotropic layer will be described in detail later.

In the present invention, the first optically anisotropic layer contains a leveling agent. The leveling agent forms a smooth surface on the first optically anisotropic layer and thus facilitates the alignment of the liquid crystal compound in the second optically anisotropic layer with a high degree of orientational order. The leveling agent decreases the surface energy of the first optically anisotropic layer because it localizes readily in the surface of the resulting coating and remains localized in the surface of the first optically anisotropic layer after drying. The surface energy ($\gamma s^v$, expressed in mJ/m$^2$) is the surface tension of the first optically anisotropic layer expressed in terms of energy (the unit mN/m is converted to the unit mJ/m$^2$) and is defined as the sum of $\gamma s^d$ and $\gamma s^h$ ($\gamma s^v = \gamma s^d + \gamma s^h$) calculated by simultaneous equations (1) and (2) below from the contact angles $\theta_{H2O}$ and $\theta_{CH2I2}$ of pure water (H$_2$O) and methylene iodide (CH$_2$I$_2$), respectively, experimentally determined on the first optically anisotropic layer, in accordance with D. K. Owens, J. Appl. Polym. Sci., 13, 1941(1969). Before measurement, the moisture control of the sample should be performed at a predetermined temperature and humidity for a predetermined period of time. The moisture control is preferably performed at a temperature of 20° C. to 27° C. and a humidity of 50% to 65% RH for 2 hours or more.

$$1+\cos\theta_{H2O}=2\sqrt{\gamma s^d}(\sqrt{\gamma_{H2O}^d/\gamma_{H2O}^{hv}})+2\sqrt{\gamma s^h}(\sqrt{\gamma_{H2O}^h/\gamma_{H2O}^v}) \quad (1)$$

$$1+\cos\theta_{CH2I2}=2\sqrt{\gamma s^d}(\sqrt{\gamma_{CH2I2}^d/\gamma_{CH2I2}^v})+2\sqrt{\gamma s^h}(\sqrt{\gamma_{CH2I2}^h/\gamma_{CH2I2}^v}) \quad (2)$$

where $\gamma_{H2O}^d=21.8°$, $\gamma_{H2O}^h=51.0°$, $\gamma_{H2O}^v=72.8°$, $\gamma_{CH2I2}^d=49.5°$, $\gamma_{CH2I2}^h=1.3°$, and $\gamma_{CH2I2}^v=50.8°$.

The first optically anisotropic layer has a surface energy of 45 mJ/m$^2$ or less, preferably 20 to 45 mJ/m$^2$, more preferably 25 to 40 mJ/m$^2$. A first optically anisotropic layer having such a surface energy allows the liquid crystal compound in the second optically anisotropic layer to be aligned with a higher degree of orientational order.

The leveling agent will be specifically described later.

The first optically anisotropic layer in the present invention has a thickness of 0.3 to 3.0 µm. If the first optically anisotropic layer has a thickness of less than 0.3 µm or more than 3.0 µm, the retardation film exhibits low front contrast when incorporated into a liquid crystal display because of the control of the retardation of the deposited first optically anisotropic layer. The first optically anisotropic layer in the present invention preferably has a thickness of 0.5 µm or more, more preferably 0.7 µm or more, even more preferably 0.9 µm or more, and preferably has a thickness of 2.8 µm or less, more preferably 2.5 µm or less, even more preferably 2.0 µm or less, further preferably 1.5 µm or less, particularly preferably 1.3 µm or less.

The first optically anisotropic layer used in the present invention preferably satisfies 80 nm≤Re(550)≤230 nm, more preferably 90 nm≤Re(550)≤220 nm, even more preferably 100 nm≤Re(550)≤200 nm, further preferably 105 nm≤Re(550)≤130 nm. Re(550) refers to the retardation in a plane at a wavelength of 550 nm.

The first optically anisotropic layer preferably satisfies 90 nm≤Rth(550)≤150 nm, more preferably 95 nm≤Rth(550)≤130 nm. Rth(550) refers to the retardation across the thickness at a wavelength of 550 nm.

The first optically anisotropic layer in the present invention preferably satisfies inequality (2);

$$0.8 \leq Nz \leq 1.2 \quad (2)$$

(where Nz is (nx−nz)/(nx−ny), nx is the refractive index in the slow axis direction in a plane, ny is the refractive index in a direction perpendicular to nx in a plane, and nz is the refractive index in a direction perpendicular to nx and ny).

Nz preferably satisfies 0.9≤Nz≤1.1, more preferably 0.9≤Nz≤1.0.

The first optically anisotropic layer preferably satisfies 100 nm≤Re(550)≤200 nm and inequality (2).

If the first optically anisotropic layer satisfies these conditions, the retardation film according to the present invention provides the advantages of the present invention more effectively when incorporated into an IPS liquid crystal display.

To achieve a higher contrast when the retardation film according to the present invention is incorporated into a liquid crystal display, the first optically anisotropic layer preferably exhibits reverse wavelength dispersion and more preferably satisfies inequality (3);

$$Re(450)/Re(650) < 1$$

(where Re(450) is the retardation in a plane at a wavelength of 450 nm, and Re(650) is the retardation in a plane at a wavelength of 650 nm).

Intermediate Layer

The intermediate layer in the present invention contains a resin having an SP value of 21.5 to 24.7 and has a thickness of 3.0 µm or less. The use of a resin having an SP value of 21.5 to 24.7 facilitates the formation of a thin smooth layer having high adhesion to the second optically anisotropic layer and the uniform alignment of the second optically anisotropic layer. This is because a material with an SP value of 21.5 to 24.7 present in the surface of an alignment film forms a hydrophilic surface, on which a vertical alignment layer can be more uniformly aligned. In contrast, liquid crystal cannot be uniformly aligned on a hydrophobic surface; it shows a schlieren texture. Thus, unlike known alignment films, the intermediate layer in the present invention is not rubbed.

The intermediate layer in the present invention may have a surface roughness (Ra) of, for example, 5 to 200 nm.

The SP value refers to a solubility parameter calculated by Hoy's method. The intermediate layer preferably has an SP value of 21.5 to 24.7, more preferably 22.5 to 24.0.

The intermediate layer preferably has a thickness of 0.05 to 2.5 µm, more preferably 0.08 to 2.3 µm, even more preferably 0.2 to 1.5 µm.

Examples of resins having an SP value of 21.5 to 24.7 include (meth)acrylic resins, bromine-containing resins, styrene-acrylonitrile-N-phenylmaleimide terpolymers (SAMs), and modified styrene resins such as poly(p-hydroxystyrene). Among these resin, preferred are (meth)acrylic resins.

The intermediate layer in the present invention preferably contains a resin having an SP value of 24 or more in an amount of 30% by mass or more. The intermediate layer may contain one or more resins having an SP value of 24 or more.

The intermediate layer preferably has polar groups. More preferably, the resin contained in the intermediate layer has polar groups. The polar groups are preferably hydroxyl. Hydroxyl, being a hydrophilic group, contributes to uniform alignment of the second optically anisotropic layer and thus tends to improve the adhesion to the first optically anisotropic layer.

The intermediate layer preferably has polymerizable groups. More preferably, the resin contained in the intermediate layer has polymerizable groups. The polymerizable groups are preferably (meth)acryloyl. The polymerizable groups maintain surface hydrophilicity, and the residual double bonds allow the first and second optically anisotropic layers to adhere to each other. The method for manufacturing the intermediate layer will be described in detail later.

Second Optically Anisotropic Layer

The second optically anisotropic layer in the present invention contains a liquid crystal compound fixed in a homeotropically aligned state and has an order parameter of 0.60 to 0.95 and a thickness of 0.3 to 3.0 µm. If the second optically anisotropic layer has a thickness of less than 0.3 µm or more than 3.0 µm, the retardation film exhibits low front contrast when incorporated into a liquid crystal display. The second optically anisotropic layer preferably has an order parameter of 0.65 to 0.80, more preferably 0.65 to 0.75. The layer having such an order parameter is preferably a layer fixed in a smectic or nematic phase. It is more preferred in terms of manufacture to select a layer fixed in a nematic phase because the alignment direction thereof is parallel to the light transmission direction. According to the present invention, an optically anisotropic layer that exhibits a smectic or nematic phase with a high degree of orientational order can be directly formed on the surface of the intermediate layer, thus providing a thinner film with high contrast.

The method for directly forming the second optically anisotropic layer on the surface of the intermediate layer will be described later.

The second optically anisotropic layer used in the present invention has a thickness of 0.3 to 3.0 µm. According to the present invention, even such a thin layer provides desired optical characteristics, which is advantageous for fabrication of thinner films. Preferably, the second optically anisotropic layer in the present invention preferably has a thickness of 0.5 µm or more, more preferably 0.7 µm or more, even more preferably 0.9 µm or more, and preferably has a thickness of 2.8 µm or less, more preferably 2.5 µm or less, even more preferably 2.0 µm or less, further preferably 1.5 µm or less, particularly preferably 1.2 µm or less.

The second optically anisotropic layer used in the present invention preferably satisfies −5 nm≤Re(550)≤5 nm (|Re≤(550)|≤5 nm), more preferably −3 nm≤Re(550)≤3 nm (|Re(550)|≤3 nm). Re(550) refers to the retardation in a plane at a wavelength of 550 nm.

The second optically anisotropic layer preferably satisfies −300 nm≤Rth (550)≤0 nm, more preferably −200 nm≤Rth (550)≤−60 nm, even more preferably −150 nm≤Rth (550)≤−80 nm. If Rth (550) falls within such a range, the retardation film according to the present invention provides the advantages of the present invention more effectively when incorporated into an IPS-mode liquid crystal display.

Method for Manufacturing Retardation Film

The retardation film according to the present invention is typically manufactured by forming the intermediate layer on a surface of the first optically anisotropic layer and then applying (preferably, by coating) and curing a composition for the second optically anisotropic layer on the surface of the intermediate layer. The methods for forming these layers will now be described in detail.

Method for Manufacturing First Optically Anisotropic Layer

A method for manufacturing the first optically anisotropic layer in the present invention will be described in detail. The first optically anisotropic layer may be manufactured by forming an alignment film on a support and then applying and curing a composition for the first optically anisotropic layer on the surface of the alignment film. Alternatively, the first optically anisotropic layer may be manufactured by rubbing a surface of a polarizing film (e.g., a polyvinyl alcohol film) and then applying and curing the composition for the first optically anisotropic layer on the surface of the polarizing film.

In the present invention, the alignment film is preferably made of a modified or unmodified polyvinyl alcohol. Examples of such polyvinyl alcohols include the modified polyvinyl alcohols disclosed in paragraphs [0071] to [0095] of Japanese Patent No. 3907735. Also available are modified polyvinyl alcohols having polymerizable groups.

The alignment film that can be used in the present invention may be a photoalignment film or an alignment film having a rubbed surface. In the present invention, common rubbing processes can be used. For example, the surface of the alignment film can be rubbed with a rubbing roller. In embodiments where the alignment film is continuously formed on a support made of a long polymer film, the direction of rubbing treatment (rubbing direction) is preferably parallel to the longitudinal direction of the support in terms of manufacture.

Rubbing treatment can be similarly performed if the first optically anisotropic layer is directly formed on the surface of the polarizing film.

A composition for the first optically anisotropic layer is then applied (typically, by coating) onto the surface of the alignment film or the polarizing film. Examples of processes for applying the composition include known processes such as curtain coating, dip coating, print coating, spray coating, slot coating, roller coating, slide coating, blade coating, gravure coating, and wire bar coating.

The composition for the first optically anisotropic layer essentially contains a liquid crystal compound and a leveling agent and optionally contains, for example, a polymerization initiator, a polymerizable compound, and a solvent.

The liquid crystal compound for the first optically anisotropic layer may be either a rod-like liquid crystal compound or a discotic liquid crystal compound, more preferably a rod-like liquid crystal compound. If the first optically anisotropic layer contains a rod-like liquid crystal compound, the second optically anisotropic layer also preferably contains a rod-like liquid crystal compound. If the first optically anisotropic layer contains a discotic liquid crystal compound, the second optically anisotropic layer also preferably contains a discotic liquid crystal compound. The liquid crystal phase of the first optically anisotropic layer is preferably a smectic phase. A compound that can exhibit both of a nematic phase and a smectic phase is preferably handled in a smectic phase by alignment control, for example, with heat.

The liquid crystal compound for the first optically anisotropic layer is preferably a liquid crystal compound that exhibits a smectic phase, more preferably a liquid crystal compound represented by formula (I);

$$Q1\text{-}SP1\text{-}X1\text{-}M\text{-}X2\text{-}SP2\text{-}Q2 \qquad (I)$$

(where Q1 and Q2 are each hydrogen, a halogen, cyano, or a polymerizable group, at least one of Q1 and Q2 being a polymerizable group; SP1 and SP2 are each a single bond or a spacer group; X1 and X2 are each a linking group; and M is a mesogen).

In formula (I), Q1 and Q2 are each independently hydrogen, cyano, a halogen, or a polymerizable group, and at least one of Q1 and Q2 is a polymerizable group. The polymerizable group is preferably addition-polymerizable (including ring-cleavage polymerization) or condensation-polymerizable. In other words, the polymerizable group is preferably an addition-polymerizable functional group or a condensation-polymerizable functional group. Examples of polymerizable groups are illustrated below.

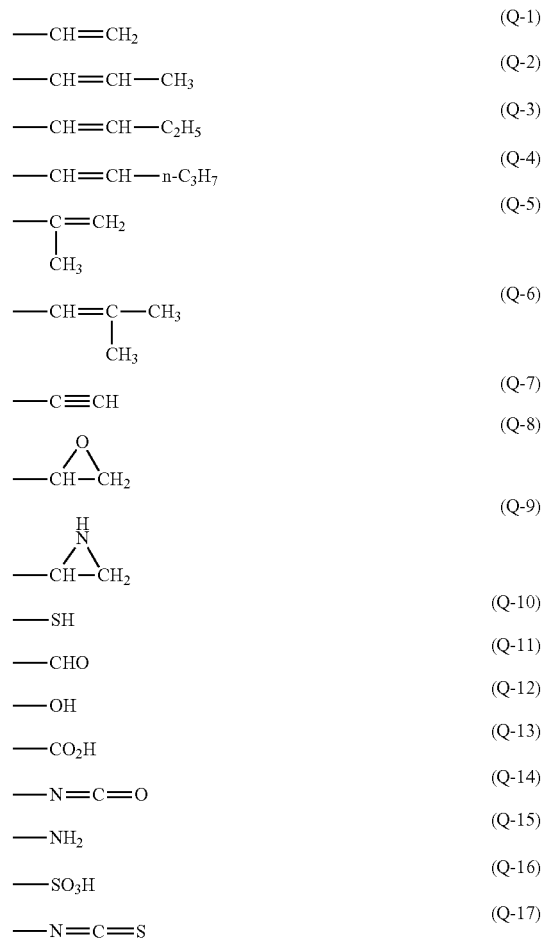

Preferably, the polymerizable group for Q1 and Q2 is an unsaturated polymerizable group (Q-1 to Q-7), epoxy (Q-8), aziridinyl (Q-9), or oxetanyl, more preferably an ethylenically unsaturated polymerizable group (Q-1 to Q-6) or epoxy. Examples of ethylenically unsaturated polymerizable groups (Q-1 to Q-6) include groups (Q-101) to (Q-106) below. Among these groups, preferred are groups (Q-101) and (Q-102).

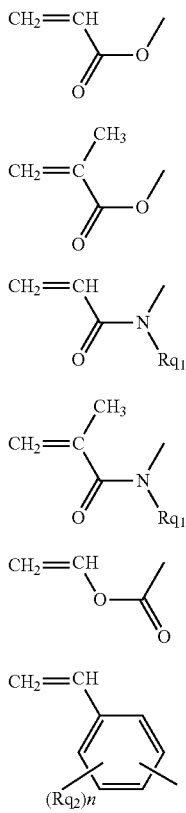

where Rq$_1$ is hydrogen, an alkyl group, or an aryl group; Rq$_2$ is a substituent; and n is an integer of 0 to 4. Preferably, Rq$_1$ is hydrogen, an alkyl group having 1 to 5 carbon atoms, or an aryl group having 6 to 12 carbon atoms, more preferably hydrogen or an alkyl group having 1 to 3 carbon atoms, even more preferably hydrogen or methyl. Preferred examples of substituents for Rq$_2$ include those described later for Ra, Rb, and Rc. Preferably, n is an integer of 0 to 2, more preferably 0 or 1.

In formula (I), SP1 and SP2 are each independently a single bond or a spacer group. Preferably, SP1 and SP2 are each independently a divalent linking group selected from the group consisting of a single bond, —O—, —S—, —CO—, —NR$^2$—, divalent linear groups, and combinations thereof, where R$^2$ is hydrogen or an alkyl group having 1 to 7 carbon atoms.

Examples of divalent linear groups include alkylene groups, substituted alkylene groups, alkenylene groups, substituted alkenylene groups, alkynylene groups, and substituted alkynylene groups, preferably alkylene groups, substituted alkylene groups, alkenylene groups, and substituted alkenylene groups, even more preferably alkylene groups and alkenylene groups. The alkylene groups may be branched. The alkylene groups preferably have 1 to 12 carbon atoms, more preferably 2 to 10 carbon atoms, most preferably 2 to 8 carbon atoms. The alkylene moieties of the substituted alkylene groups are similar to the above alkylene groups. Examples of substituents on the substituted alkylene groups include alkoxy groups and halogens. The alkenylene groups may be branched. The alkenylene groups preferably have 2 to 12 carbon atoms, more preferably 2 to 10 carbon atoms, most preferably 2 to 8 carbon atoms. The alkenylene moieties of the substituted alkenylene groups are similar to the above alkenylene groups. Examples of substituents on the substituted alkenylene groups include alkoxy groups and halogens. The alkynylene groups may be branched. The alkynylene groups preferably have 2 to 12 carbon atoms, more preferably 2 to 10 carbon atoms, most preferably 2 to 8 carbon atoms. The alkynylene moieties of the substituted alkynylene groups are similar to the above alkynylene groups. Examples of substituents on the substituted alkynylene groups include alkoxy groups and halogens. One or more of the CH$_2$ groups that are not adjacent to each other in the divalent linear groups may be replaced with —O—, —C(=O)—O—, —O—C(=O)—, —O—C(=O)—O—, —C(=O)—, or —S—. The spacer groups preferably have a total of 1 or more carbon atoms, more preferably a total of 2 to 30 carbon atoms, even more preferably a total of 4 to 20 carbon atoms.

In formula (I), X1 and X2 are each a linking group. X1 and X2 are each independently a divalent linking group selected from the group consisting of a single bond, —O—, —S—, —C(=O)—, —NR$^2$— (where R$^2$ is as defined above), and combinations thereof. More preferably, X1 and X2 are each a single bond, —O—, —C(=O)—O—, —O—C(=O)—, —C(=O)—NH—, —NH—C(=O)—, or —O—C(=O)—O—.

If Q1 or Q2 in formula (I) is a polymerizable group, preferred examples of —SP1-X1- or —X2-SP2- include, but not limited to, the following groups. In the examples below, symbol * indicates a position to which Q1 or Q2 is attached.

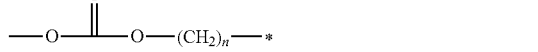

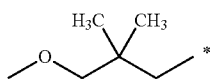
(SP-6b)

In the above formulae, n and m are each an integer of 1 or more. Preferably, n is an integer of 1 to 20, more preferably 2 to 10, and m is an integer of 1 to 10, more preferably 1 to 6.

If Q1 or Q2 in formula (I) is hydrogen or halogen, the —SP1-X1- or —X2-SP2- attached to the hydrogen or halogen is preferably an optionally substituted alkyl group having 1 to 10 carbon atoms or an optionally substituted alkoxy group having 1 to 10 carbon atoms.

If Q1 or Q2 in formula (I) is cyano, the —SP1-X1- or —X2-SP2-attached to the cyano is preferably a single bond.

In formula (I), M is a mesogen represented by formula (I-1);

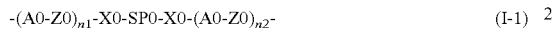
(I-1)

where A0 is a divalent ring structure, preferably 1,4-phenylene, 1,4-cyclohexylene, 2,5-pyridyl, or 2,5-pyrimidyl. These rings may be substituted. More preferably, A0 is 1,4-phenylene. At least one of the rings is preferably substituted to improve compatibility with other materials and solubility in a predetermined solvent.

Suitable substituents can be selected depending on the required physical properties. Examples of substituents include halogens, cyano, nitro, alkyl groups having 1 to 5 carbon atoms, halogen-substituted alkyl groups having 1 to 5 carbon atoms, alkoxy groups having 1 to 5 carbon atoms, alkylthio groups having 1 to 5 carbon atoms, acyl groups having 1 to 5 carbon atoms, acyloxy groups having 2 to 6 carbon atoms, alkoxycarbonyl groups having 2 to 6 carbon atoms, carbamoyl, alkyl-substituted carbamoyl groups having 2 to 6 carbon atoms, and amide groups having 2 to 6 carbon atoms, more preferably halogens, cyano, alkyl groups having 1 to 3 carbon atoms, halogen-substituted alkyl groups having 1 to 3 carbon atoms, alkoxy groups having 1 to 3 carbon atoms, and acyloxy groups having 2 to 4 carbon atoms.

Z0 is a single bond, —O—CO—, —CO—O—, —CH=CH—, —CH=N—, —N=CH—, —CH=CH—CO—O—, —O—CO—CH=CH—, or —O—CO—O—, preferably a single bond, —O—CO—, or —CO—O—.

SP0 is a single bond or a divalent spacer group, preferred examples of which are as described above for SP1. X0 is a divalent linking group, preferred examples of which are as described above for X1.

n1 and n2 are each an integer of 1 to 4. A0's and Z0's may be the same or different.

The compound represented by formula (I) is preferably represented by formula (II);

Q1-SP1-X1-A-B-C-(D)$_{m1}$-X2-SP2-Q2 (II)

where Q1 and Q2 are each independently hydrogen, cyano, a halogen, or a polymerizable group, and at least one of Q1 and Q2 is a polymerizable group. The details and preferred examples of the polymerizable group are as described above for formula (I). m1 is an integer of 1 to 5.

In formula (II), SP1 and SP2 are each a single bond or a spacer group, and X1 and X2 are each a linking group. The details and preferred examples of SP1, SP2, X1, and X2 are as described above for formula (I).

In formula (II), A, B, C, and D are each selected from the divalent groups represented by formulae IIa, IIb, and IIc;

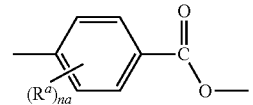
IIa

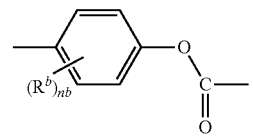
IIb

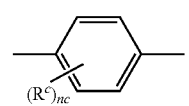
IIc where $R^a$, $R^b$, and $R^c$ are each a substituent, and na, nb, and nc are each an integer of 0 to 4. If na, nb, and nc are each an integer of 2 or more, $R^a$'s, $R^b$'s, and $R^c$'s may be the same or different.

If the compound of formula (II) includes a plurality of ester bonds (—C(=O)O— or —OC(=O)—) in which the atoms are arranged in the same order, it readily forms a smectic phase. The structure in which D is the divalent group of formula IIa and X2 is a single bond in formula (II) is the same as the structure in which D is the divalent group of formula IIc and X2 is —C(=O)O—; thus, the latter structure is defined as the former structure in which D is the divalent group of formula IIa and X2 is a single bond. Similarly, the structure in which D is the divalent group of formula IIb and X2 is a single bond is the same as the structure in which D is the divalent group of formula IIc and X2 is —OC(=O)—; thus, the latter structure is defined as the former structure.

In formula (II), at least one of A, B, C, and D is preferably substituted (i.e., at least one of na, nb, and nc is preferably an integer of 1 or more). The introduction of a substituent improves compatibility with other materials and solubility in a predetermined solvent so that a liquid crystal composition can be readily prepared. Different substituents can be introduced to achieve different phase transition temperatures. Suitable substituents can be selected depending on the required physical properties. Examples of substituents denoted by $R^a$, $R^b$, and $R^c$ include halogens, cyano, nitro, alkyl groups having 1 to 5 carbon atoms, halogen-substituted alkyl groups having 1 to 5 carbon atoms, alkoxy groups having 1 to 5 carbon atoms, alkylthio groups having 1 to 5 carbon atoms, acyl groups having 1 to 5 carbon atoms, acyloxy groups having 2 to 6 carbon atoms, alkoxycarbonyl groups having 2 to 6 carbon atoms, carbamoyl, alkyl-substituted carbamoyl groups having 2 to 6 carbon atoms, and amide groups having 2 to 6 carbon atoms, more preferably halogens, cyano, alkyl groups having 1 to 3 carbon atoms, halogen-substituted alkyl groups having 1 to 3 carbon atoms, alkoxy groups having 1 to 3 carbon atoms, and acyloxy groups having 2 to 4 carbon atoms.

If m1 in formula (II) is 0, -A-B-C- is preferably composed of the divalent group represented by formula IIa alone or a combination of the divalent groups represented by formulae IIa and IIc. Preferred combinations of -A-B-C- are as follows. The examples below have molecular structures that include a plurality of ester bonds in which the atoms are arranged in the same order and thus readily form a smectic phase. As described above, $R^a$'s, $R^b$'s, $R^c$'s, na's, nb's, and nc's in formulae IIa, IIb, and IIc may be the same or different.

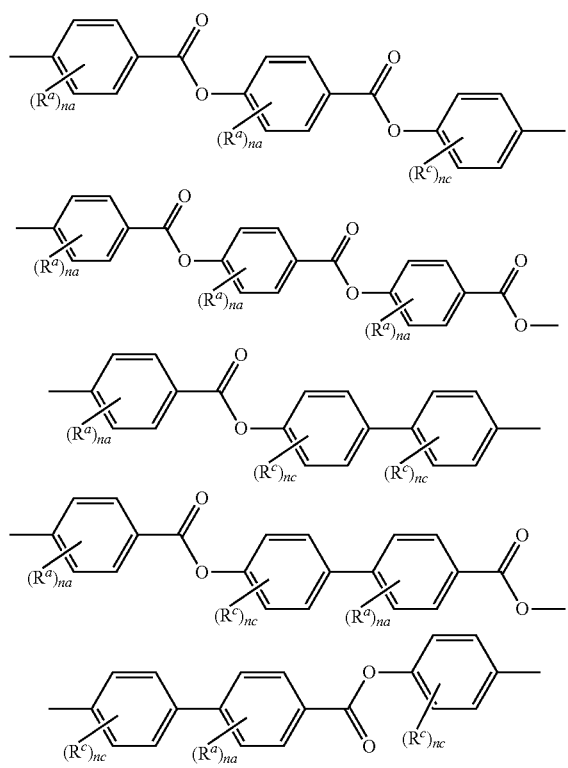
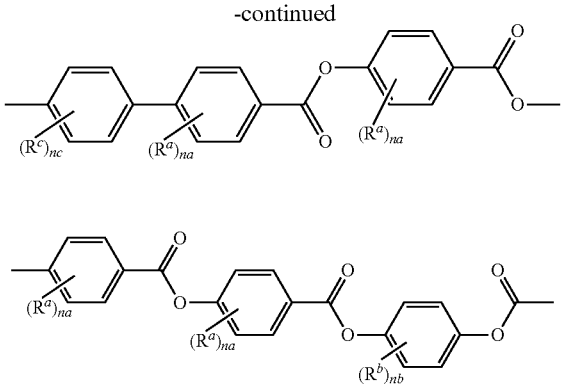

If m1 in formula (II) is 1, at least two of A, B, C, and D are preferably the divalent group represented by formula IIa or the divalent group represented by formula IIb. For ease of synthesis, -A-B-C-D- is preferably composed of the divalent group represented by formula IIa alone or a combination of the divalent groups represented by formulae IIa and IIc, more preferably a combination of the divalent groups represented by formulae IIa and IIc.

If m1 in formula (II) is 1, preferred combinations of -A-B-C-D- are as follows. The examples below have molecular structures that include a plurality of ester bonds in which the atoms are arranged in the same order and thus readily form a smectic phase. As described above, $R^a$'s, $R^b$'s, $R^c$'s, na's, nb's, and nc's in the formulae may be the same or different.

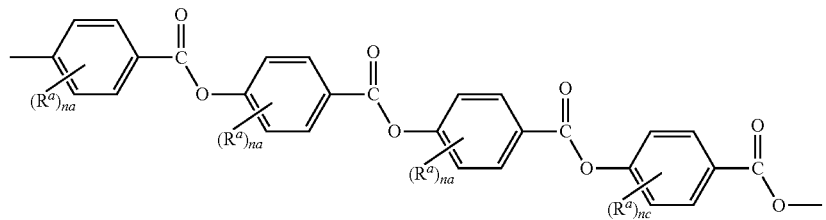
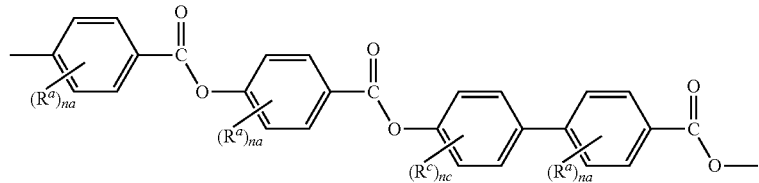
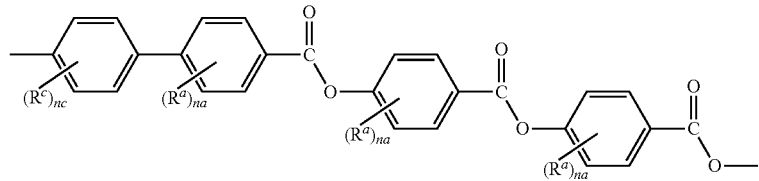
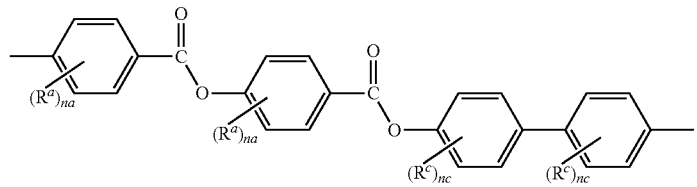

-continued

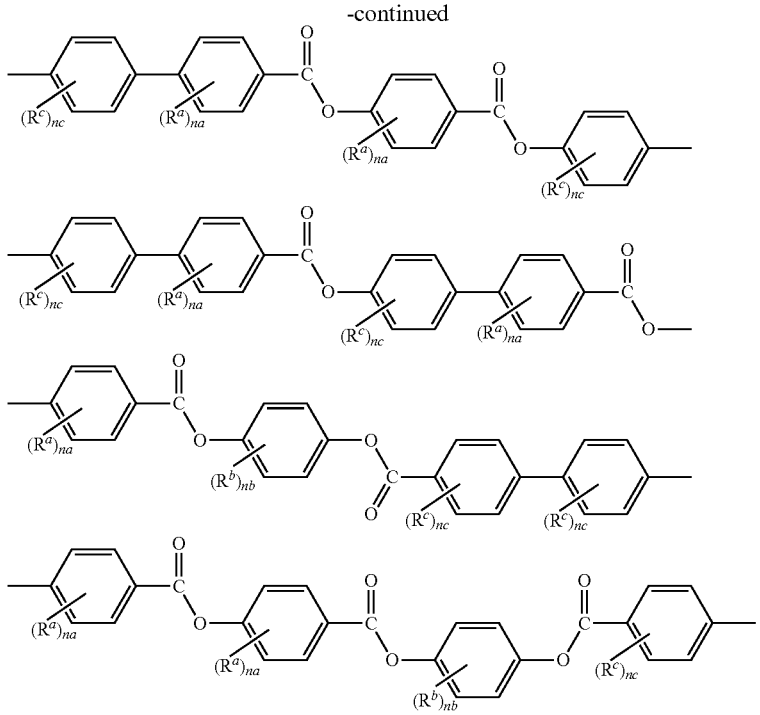

More preferably, the compound represented by formula (I) is a compound represented by formula (III);

$$Q1\text{-}SP1\text{-}X1\text{-}A1\text{-}B1\text{-}C1\text{-}(D1)_{m1}\text{-}Y1\text{-}L\text{-}Y2\text{-}(D2)_{m2}\text{-}C2\text{-}B2\text{-}A2\text{-}X2\text{-}SP2\text{-}Q2 \quad (III)$$

where Q1 and Q2 are each independently hydrogen, cyano, a halogen, or a polymerizable group, and at least one of Q1 and Q2 is a polymerizable group. The details and preferred examples of the polymerizable group are as described above for formula (I).

In formula (III), SP1 and SP2 are each a single bond or a spacer group, and X1, X2, Y1, and Y2 are each a linking group. The details and preferred examples of SP1, SP2, X1, and X2 are as described above for formula (I). The details and preferred examples of Y1 and Y2 are as described above for X1 and X2 in formula (I).

In formula (III), L is a spacer group having 4 or more atoms and including a linear structure, preferably a divalent linking group selected from the group consisting of —O—, —S—, —CO—, —NR$^2$—, divalent linear groups, and combinations thereof, where R$^2$ is hydrogen or an alkyl group having 1 to 7 carbon atoms. The divalent linear groups are as described above for SP1 and SP2 in formula (I), and preferred examples are also as described above. Preferably, L includes a divalent linear group, preferred examples of which include —(CH$_2$)$_n$—, —(C$_a$H$_{2a}$X)$_n$—, and combinations thereof, where n is an integer of 2 or more (preferably, 2 to 20), and a is an integer of 2 or more (preferably 2 to 16). If there are a plurality of n's in the compound represented by formula (III), each n may be the same or different. X is —O—, —CO—O—, —O—CO—, —O—CO—O—, —CO—, or —S—, preferably —O— or —S—. In the formulae, the hydrogen, or H, may be replaced with C1-C6 alkyl, such as methyl or ethyl, and some of the C—C bonds may be replaced with C=C bonds.

In formula (III), —Y1-L-Y2- is preferably a group selected from group (III-1);

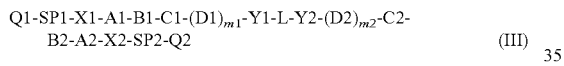
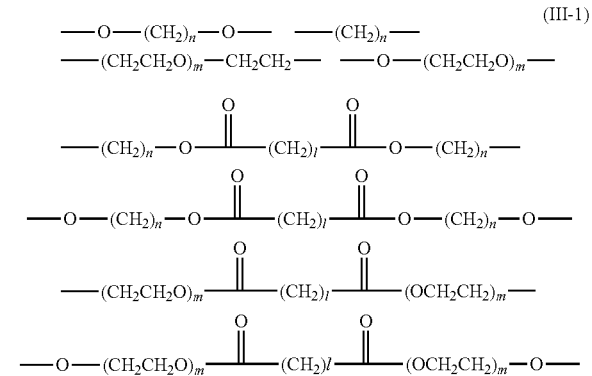

where n and m are each an integer of 1 or more, and l is an integer of 0 or more. Preferably, n is an integer of 1 to 20, m is an integer of 1 to 5, and l is an integer of 0 to 6.

In formula (III), A1, A2, B1, B2, C1, C2, D1, and D2 are each selected from the group consisting of the divalent groups represented by formulae IIa, IIb, and IIc;

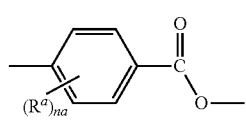

IIa

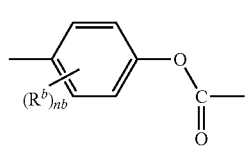

IIb

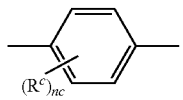
IIc where $R^a$, $R^b$, and $R^c$ are each a substituent, and na, nb, and nc are each an integer of 0 to 4. If na, nb, and nc are each an integer of 2 or more, $R^a$'s, $R^b$'s, and $R^c$'s may be the same or different.

The introduction of the substituents in formulae IIa, IIb, and IIc, i.e., $R^a$, $R^b$, and $R^c$, to A1, A2, B1, B2, C1, C2, D1, and D2 in formula (III) improves compatibility with other materials and solubility in a predetermined solvent so that a liquid crystal composition can be readily prepared. Different substituents can be used to achieve different phase transition temperatures. Suitable substituents can be selected depending on the required physical properties. The substituents denoted by $R^a$, $R^b$, and $R^c$ are as described above for formula (II).

If the compound of formula (III) includes a plurality of ester bonds (—C(=O)O— or —OC(=O)—) in which the atoms are arranged in the same order, it readily forms a smectic phase. The structure in which D1 is the divalent group of formula IIa and Y1 is a single bond in formula (III) is the same as the structure in which D1 is the divalent group of formula IIc and Y1 is —C(=O)O—; thus, the latter structure is defined as the former structure in which D1 is the divalent group of formula IIa and Y1 is a single bond. Similarly, the structure in which D1 is the divalent group of formula IIb and X2 is a single bond is the same as the structure in which D1 is the divalent group of formula IIc and X2 is —OC(=O)—; thus, the latter structure is defined as the former structure.

In formula (III), m1 and m2 are each independently 0 or 1.

If m1 in formula (III) is 0, -A1-B1-C1- is preferably composed of the divalent group represented by formula IIa alone or a combination of the divalent groups represented by formulae IIa and IIc. Preferred combinations of -A1-B1-C1- are as described above for -A-B-C- in formula (II). As described above, $R^a$'s, $R^b$'s, $R^c$'s, na's, nb's, and nc's may be the same or different.

If m2 in formula (III) is 0, preferred examples of A2, B2, and C2 are as described above for A1, B1, and C1. If m1 and m2 are both 0, -A1-B1-C1- and -A2-B2-C2- may be the same or different. For ease of synthesis, -A1-B1-C1- and -A2-B2-C2- should preferably be the same.

If m1 in formula (III) is 1, A1, B1, C1, and D1 are each selected from the divalent groups represented by formulae IIa, IIb, and IIc above. At least two of A1, B1, C1, and D1 are the divalent group represented by formula IIa or the divalent group represented by formula IIb. Similarly, if m2 in formula (III) is 1, A2, B2, C2, and D2 are each selected from the divalent groups represented by formulae IIa, IIb, and IIc above. At least two of A2, B2, C2, and D2 are the divalent group represented by formula IIa or the divalent group represented by formula IIb.

If m1 in formula (III) is 1, -A1-B1-C1-D1- is preferably composed of the divalent group represented by formula IIa alone or a combination of the divalent groups represented by formulae IIa and IIc, more preferably a combination of the divalent groups represented by formulae IIa and IIc, for ease of synthesis. Preferred combinations of -A1-B1-C1-D1- are as described above for -A-B-C-D- in formula (II). As described above, $R^a$'s, $R^b$'s, $R^c$'s, na's, nb's, and nc's in formulae IIa, IIb, and IIc may be the same or different.

If m2 in formula (III) is 1, preferred combinations of -D2-C2-B2-A2- are as described above for -A1-B1-C1-D1-. If m1 and m2 are both 1, -A1-B1-C1-D1- and -D2-C2-B2-A2- may be the same or different. For ease of synthesis, -A1-B1-C1-D1- and -D2-C2-B2-A2- should preferably be the same.

In formula (III), m1 and m2 may be different. For ease of synthesis, however, m1 and m2 should preferably be the same.

Examples of compounds represented by formulae (II) and (III) include, but not limited to, the compounds disclosed in paragraphs [0033] to [0039] of Japanese Unexamined Patent Application Publication No. 2008-19240, the compounds disclosed in paragraphs [0037] to [0041] of Japanese Unexamined Patent Application Publication No. 2008-214269, the compounds disclosed in paragraphs [0033] to [0040] of Japanese Unexamined Patent Application Publication No. 2006-215437, and the following compounds;

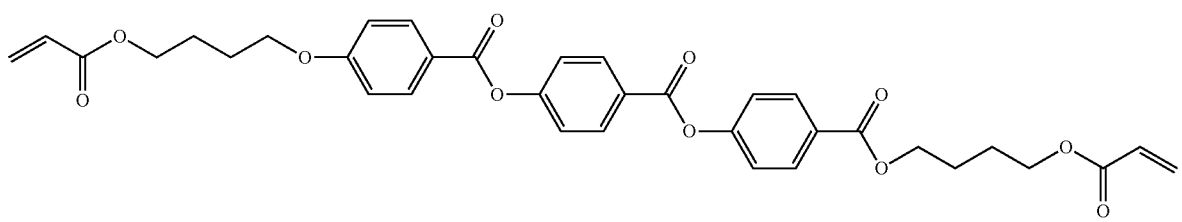

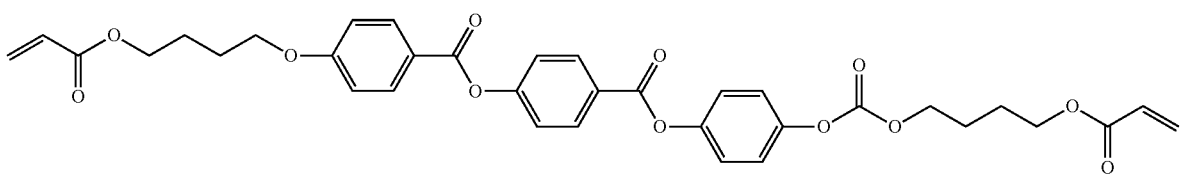

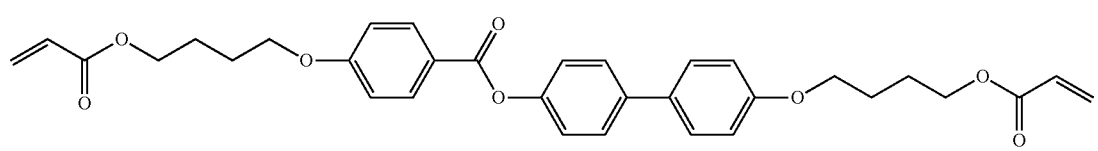

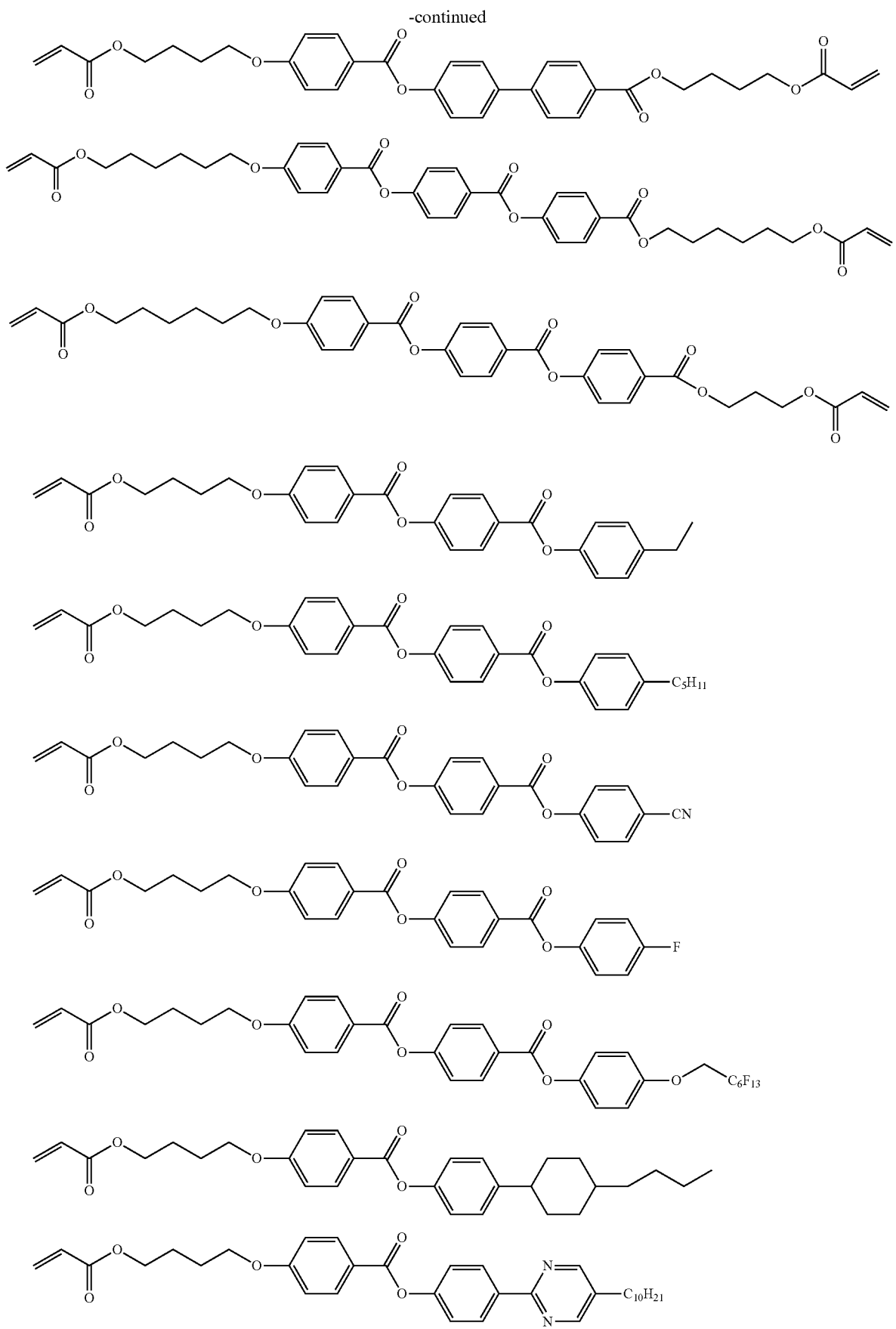

-continued
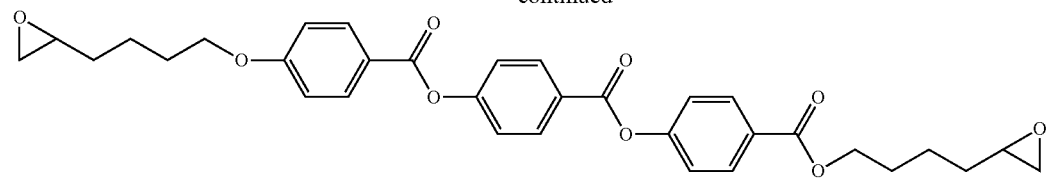
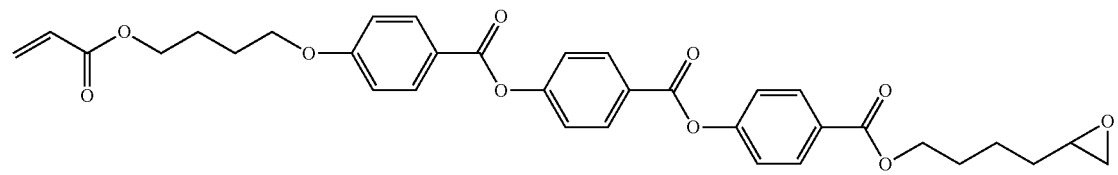
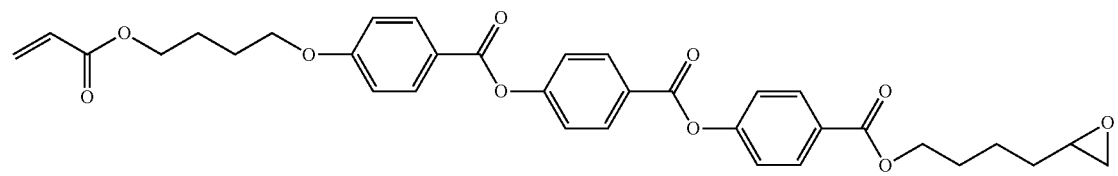
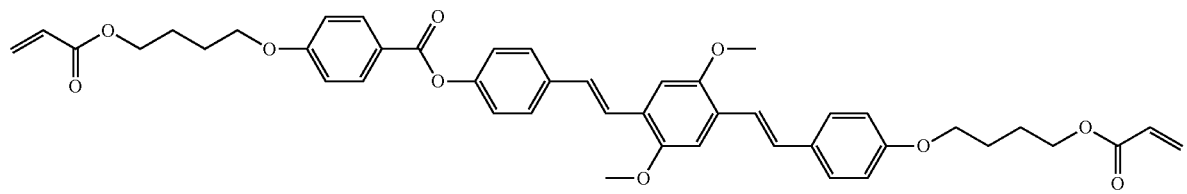
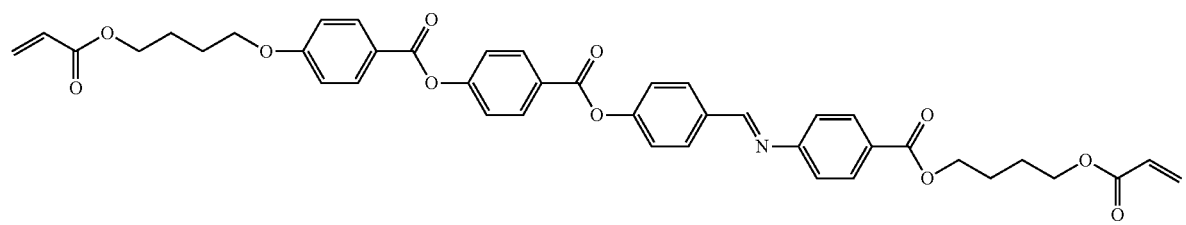
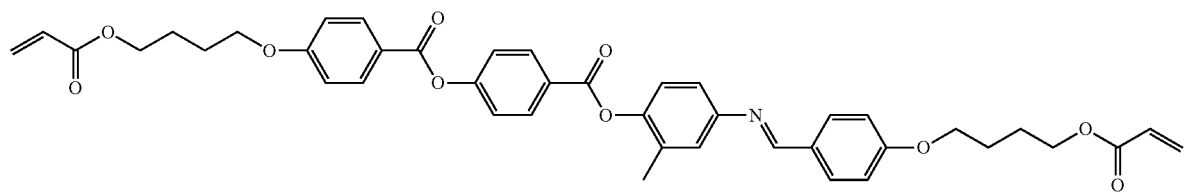
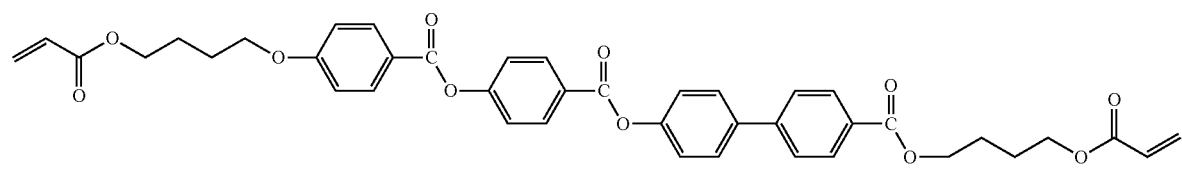
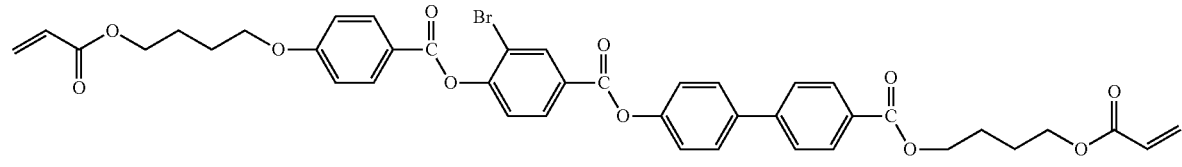
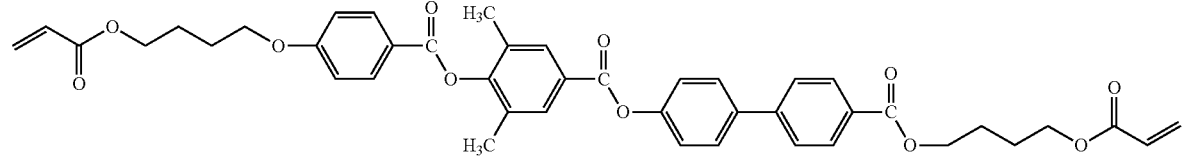

-continued
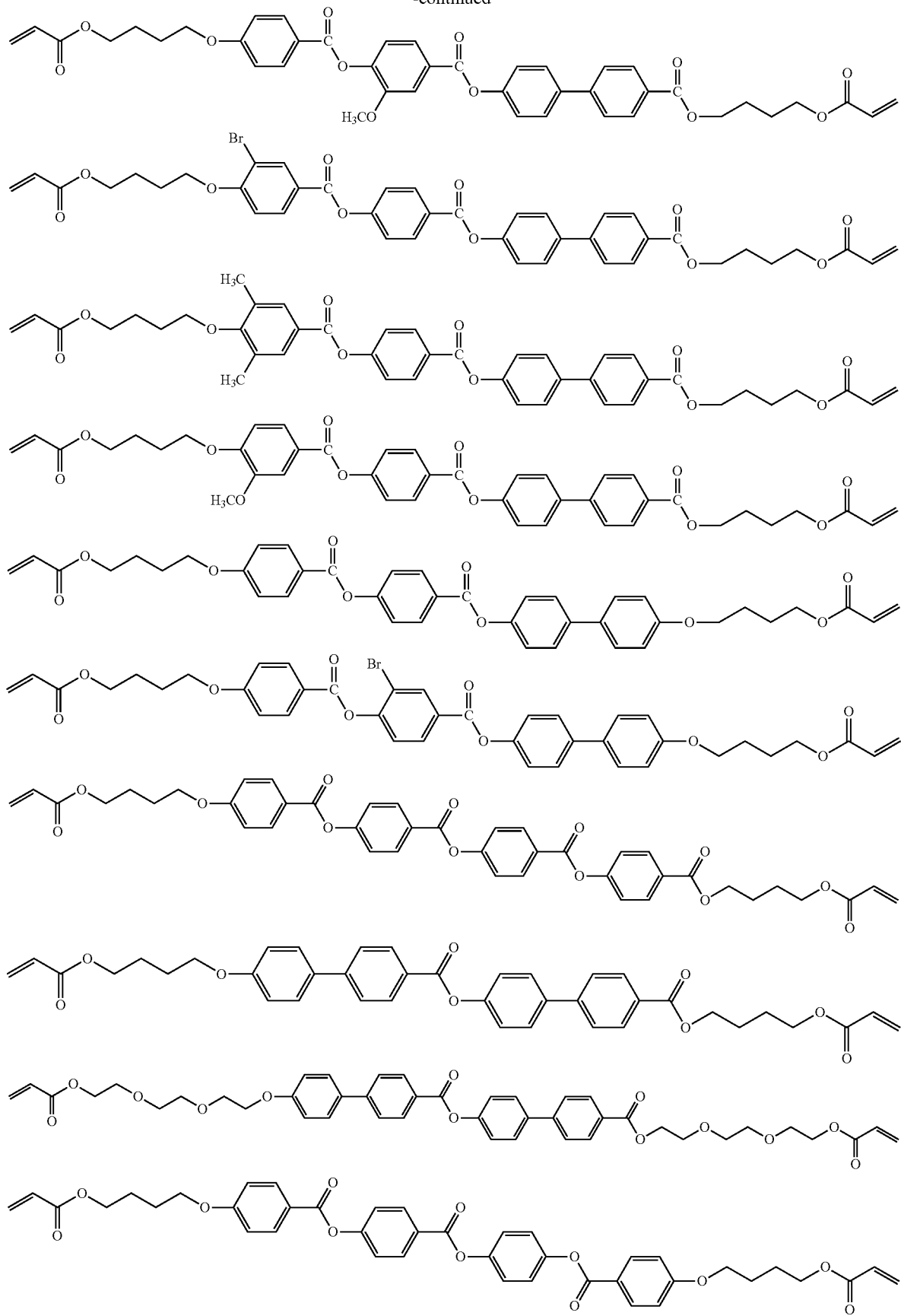

-continued
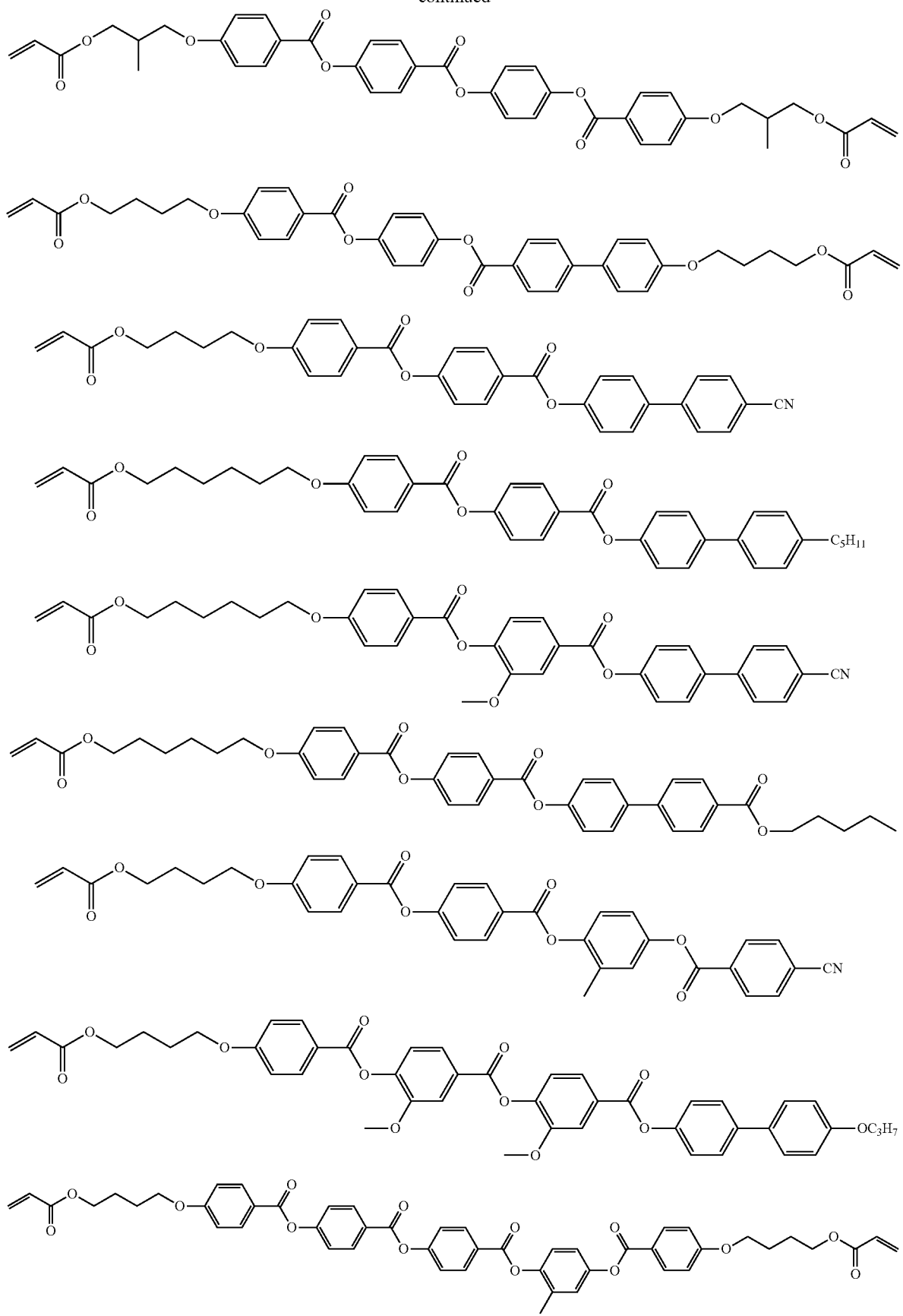

31
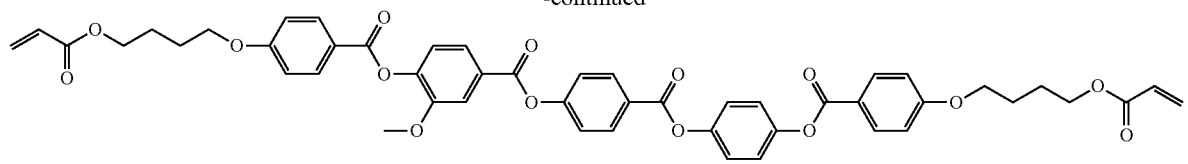
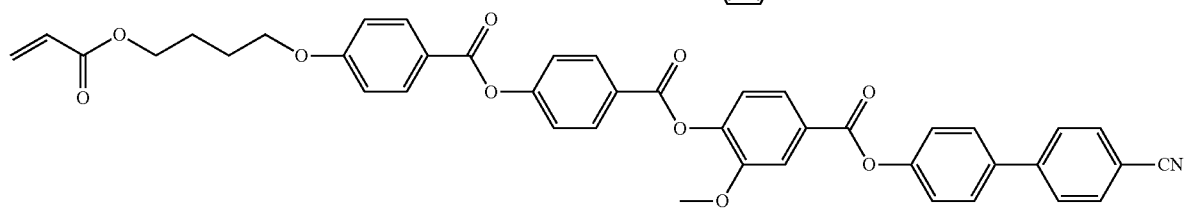
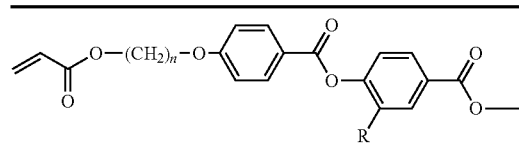
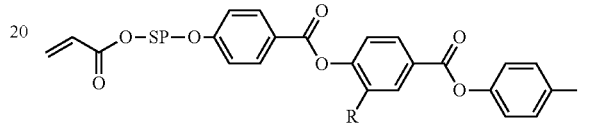
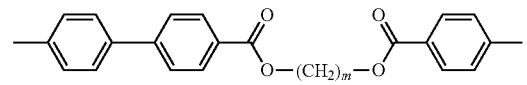
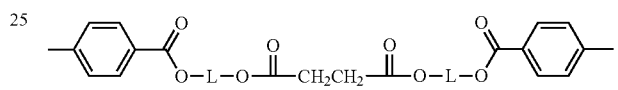
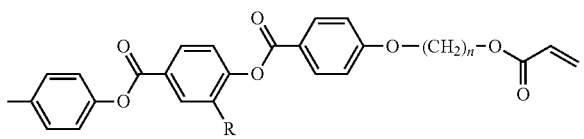
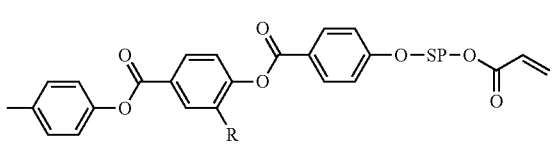
| n | m | R |
|---|---|---|
| 4 | 4 | H |
| 4 | 6 | H |
| 4 | 10 | H |
| 6 | 10 | H |
| 6 | 12 | H |
| 4 | 8 | OCH₃ |
| 4 | 12 | OCH₃ |
| 6 | 10 | Br |
| 6 | 12 | Br |
| 8 | 12 | OCH₃ |
| SP | L | R |
|---|---|---|
| —(CH₂)₄— | —(CH₂)₃— | H |
| —(CH₂)₄— | —(CH₂)₃— | Br |
| —(CH₂)₄— | —(CH₂)₃— | OCH₃ |
| —CH₂CH(CH₃)CH₂— | —(CH₂)₃— | H |
| —(CH₂CH₂O)₂CH₂CH₂— | —(CH₂)₄— | H |
| —(CH₂CH₂O)₂CH₂CH₂— | —(CH₂CH₂O)₂CH₂CH₂— | H |
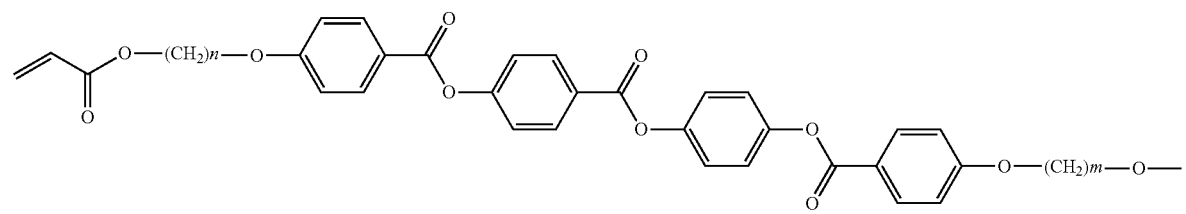
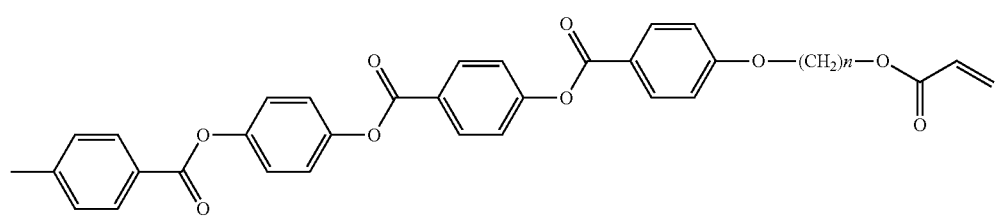
n = 4, m = 8

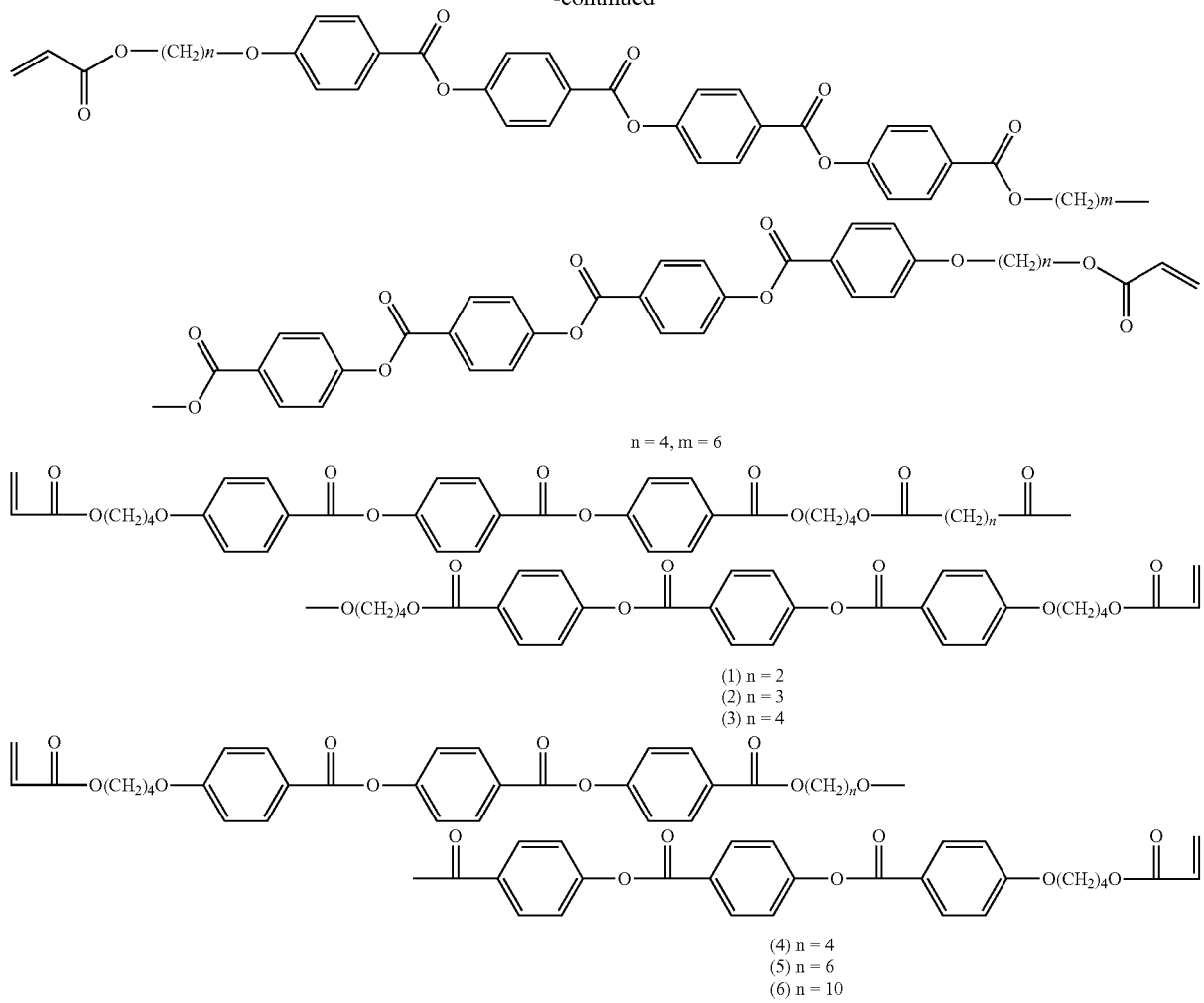

(1) n = 2
(2) n = 3
(3) n = 4

(4) n = 4
(5) n = 6
(6) n = 10

The compounds represented by formulae (I) to (III) can be synthesized by a combination of known synthesis reactions. Specifically, these compounds can be synthesized by methods disclosed in various documents (for example, Methoden der Organischen Chemie (Houben-Weyl), Thieme Verlag, Stuttgart; Experimental Chemistry (Jikken Kagaku Koza); and New Experimental Chemistry (Shin Jikken Kagaku Koza)). Also available are the synthesis methods disclosed in the specifications of U.S. Pat. Nos. 4,683,327, 4,983,479, 5,622,648, and 5,770,107, International Publication Nos. WO 95/22586, WO 97/00600, and WO 98/47979, and British Patent No. 2,297,549.

The compounds represented by formulae (I) to (III) are preferably liquid crystal compounds that transition to a smectic phase at 80° C. to 180° C. (more preferably, 70° C. to 150° C.). The transition to a smectic phase at such temperatures is preferred because it allows an anisotropic material that exhibits anisotropy due to a smectic phase to be stably manufactured, for example, without excess heating or cooling.

Examples of liquid crystal compounds used in the first optically anisotropic layer in the present invention include the reactive mesogen compounds disclosed in paragraphs [0013] to [0030] of Japanese Unexamined Patent Application Publication No. 10-319408, the reactive mesogen compounds disclosed in Japanese Unexamined Patent Application Publication (Translation of PCT Application) No. 2000-514202 (particularly, the compounds shown below), and the photochemically oligomer-forming or polymerizable liquid crystals disclosed in Japanese Unexamined Patent Application Publication (Translation of PCT Application) No. 2001-527570, particularly the compounds disclosed in the Examples section thereof, the entire disclosure of which is incorporated herein by reference.

Another example of the liquid crystal compound used in the first optically anisotropic layer in the present invention may be a side-chain liquid crystal oligomer disclosed in Japanese Unexamined Patent Application Publication No. 6-331826.

Examples of discotic liquid crystal compounds used in the first optically anisotropic layer include the compounds represented by formula (II) in Japanese Unexamined Patent Application Publication No. 2008-050553, and preferred examples are also as described therein.

Discotic liquid crystal compounds used in the present invention are further illustrated by the following examples, although these examples are not intended to limit the present invention. The following compounds are denoted by numerals in parentheses as "example compound (x)" unless otherwise specified.

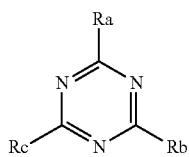

(where Ra, Rb, and Rc are each any of the groups listed in the following tables).

TABLE 2

| Exemplary compound | Ra | Rb | Rc |
|---|---|---|---|
| (1) | T-1 | T-1 | T-1 |
| (2) | T-2 | T-2 | T-2 |
| (3) | T-3 | T-3 | T-3 |
| (4) | T-4 | T-4 | T-4 |
| (5) | T-5 | T-5 | T-5 |
| (6) | T-6 | T-6 | T-6 |
| (7) | T-7 | T-7 | T-7 |
| (8) | T-8 | T-8 | T-8 |
| (9) | T-9 | T-9 | T-9 |
| (10) | T-10 | T-10 | T-10 |
| (11) | T-11 | T-11 | T-11 |
| (12) | T-12 | T-12 | T-12 |
| (13) | T-13 | T-13 | T-13 |
| (14) | T-14 | T-14 | T-14 |
| (15) | T-15 | T-15 | T-15 |
| (16) | T-15 | T-15 | T-43 |
| (17) | T-15 | T-15 | T-50 |
| (18) | T-16 | T-16 | T-16 |
| (19) | T-17 | T-17 | T-17 |
| (20) | T-18 | T-18 | T-18 |
| (21) | T-18 | T-18 | T-43 |
| (22) | T-18 | T-18 | T-44 |
| (23) | T-18 | T-18 | T-45 |
| (24) | T-18 | T-18 | T-46 |
| (25) | T-18 | T-18 | T-47 |
| (26) | T-18 | T-18 | T-48 |
| (27) | T-18 | T-18 | T-49 |

TABLE 2-continued

| Exemplary compound | Ra | Rb | Rc |
|---|---|---|---|
| (28) | T-18 | T-18 | T-50 |
| (29) | T-18 | T-18 | T-29 |
| (30) | T-18 | T-18 | T-30 |
| (31) | T-18 | T-18 | T-3 |
| (32) | T-19 | T-19 | T-19 |
| (33) | T-20 | T-20 | T-20 |
| (34) | T-21 | T-21 | T-21 |
| (35) | T-22 | T-22 | T-22 |
| (36) | T-23 | T-23 | T-23 |
| (37) | T-24 | T-24 | T-24 |
| (38) | T-25 | T-25 | T-25 |
| (39) | T-26 | T-26 | T-26 |
| (40) | T-27 | T-27 | T-27 |

TABLE 3

| Exemplary compound | Ra | Rb | Rc |
|---|---|---|---|
| (41) | T-27 | T-27 | T-46 |
| (42) | T-27 | T-27 | T-47 |
| (43) | T-27 | T-46 | T-46 |
| (44) | T-28 | T-28 | T-28 |
| (45) | T-29 | T-29 | T-29 |
| (46) | T-30 | T-30 | T-30 |
| (47) | T-31 | T-31 | T-31 |
| (48) | T-32 | T-32 | T-32 |
| (49) | T-33 | T-33 | T-33 |
| (50) | T-34 | T-34 | T-34 |
| (51) | T-35 | T-35 | T-35 |
| (52) | T-36 | T-36 | T-36 |
| (53) | T-37 | T-37 | T-37 |
| (54) | T-38 | T-38 | T-38 |
| (55) | T-39 | T-39 | T-39 |
| (56) | T-40 | T-40 | T-40 |
| (57) | T-41 | T-41 | T-41 |
| (58) | T-42 | T-42 | T-42 |

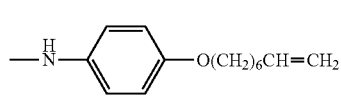
(T-1)

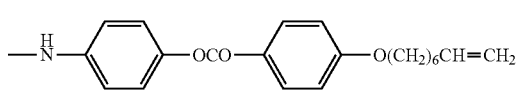
(T-2)

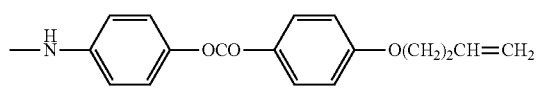
(T-3)

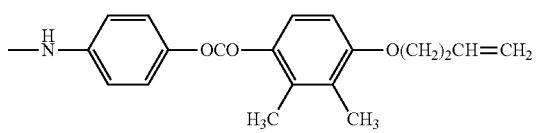
(T-4)

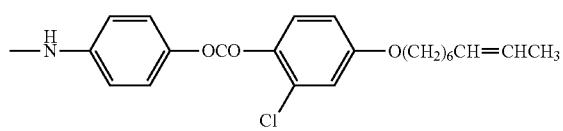
(T-5)

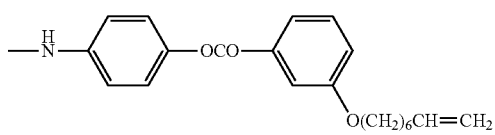
(T-6)

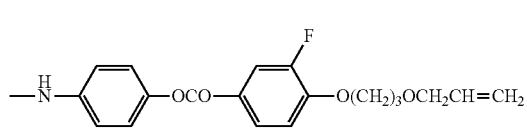
(T-7)

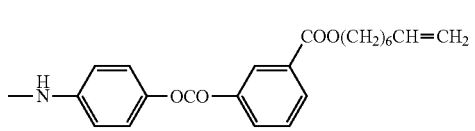
(T-8)

-continued
(T-9) 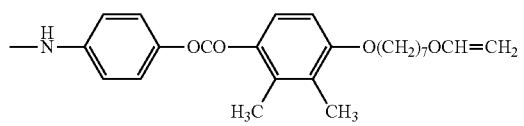
(T-10) 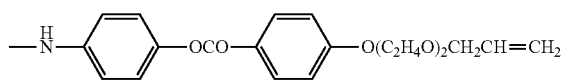
(T-11) 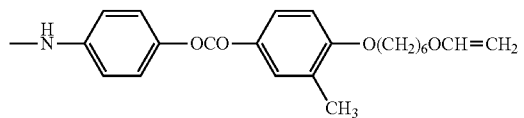
(T-12) 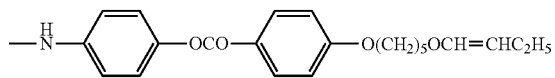
(T-13) 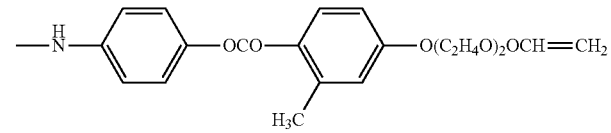
(T-14) 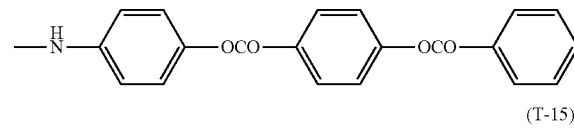
(T-15) 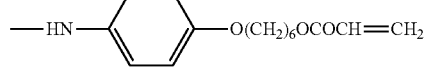
(T-16) 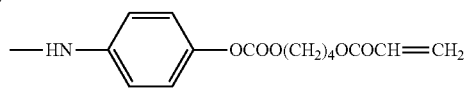
(T-17) 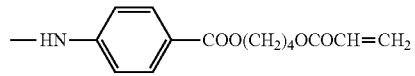
(T-18) 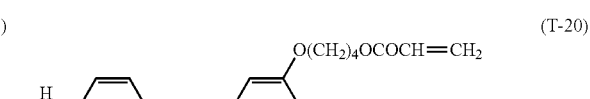
(T-19) 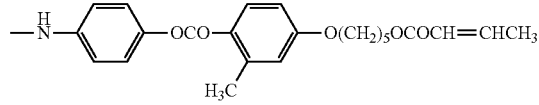
(T-20) 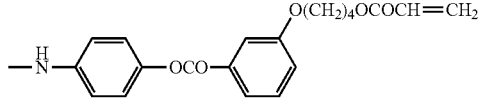
(T-21) 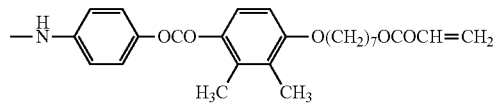
(T-22) 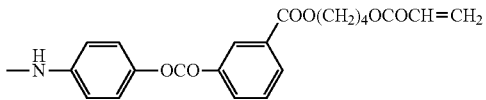
(T-23) 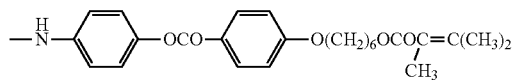
(T-24) 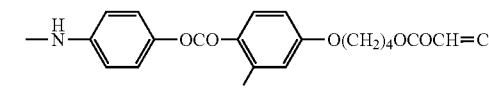
(T-25) 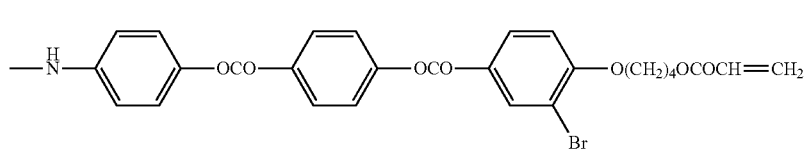
(T-26) 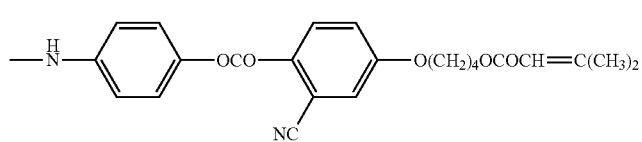
(T-27) 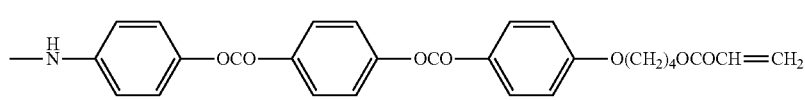

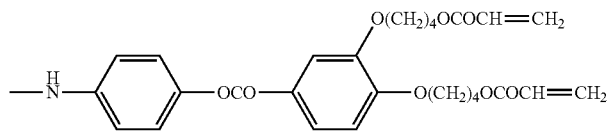

(T-28)

The composition used for the first optically anisotropic layer in the present invention is preferably a liquid crystal composition containing at least one of the compounds represented by formulae (I) to (III) and capable of transitioning to a smectic phase, preferably at 80° C. to 180° C., more preferably at 70° C. to 150° C.

The composition used for the first optically anisotropic layer in the present invention may contain one or more liquid crystal compounds. The composition for the first optically anisotropic layer may further contain other liquid crystal compounds without departing from the spirit of the present invention. For example, the composition for the first optically anisotropic layer may contain rod-like liquid crystal compounds such as azomethines, azoxies, cyanobiphenyls, cyanophenyl esters, benzoate esters, phenyl cyclohexanecarboxylates, cyanophenylcyclohexanes, cyano-substituted phenylpyrimidines, alkoxy-substituted phenylpyrimidines, phenyldioxanes, tolans, and alkenylcyclohexylbenzonitriles.

The composition for the first optically anisotropic layer preferably contains the liquid crystal compounds in an amount of 50% to 98% by mass, more preferably 70% to 95% by mass, based on the total solid content.

The leveling agent used in the present invention will now be described.

The leveling agent used in the present invention is preferably a fluorine-containing leveling agent or a silicon-containing leveling agent, more preferably a fluorine-containing leveling agent, even more preferably a compound including a benzene ring or triazine ring having at least two substituents having a perfluoroalkyl group. The substituents having a perfluoroalkyl group are preferably $C_nF_{2n+1}$-L-O— (where L is a combination of —$CH_2$—, —O—, and —CO—). The leveling agent preferably has a molecular weight of 500 to 10,000. More preferably, the leveling agent has a molecular weight of 500 to 2,000 so that it can readily localize in the surface, even in smaller amounts.

Preferred examples of leveling agents include the compounds disclosed in paragraphs [0079] to [0102] of Japanese Unexamined Patent Application Publication No. 2007-069471, the compounds represented by formula (I) in Japanese Unexamined Patent Application Publication No. 2013-047204 (particularly, the compounds disclosed in paragraphs [0020] to [0032]), the compounds represented by formula (I) in Japanese Unexamined Patent Application Publication No. 2012-211306 (particularly, the compounds disclosed in paragraphs [0022] to [0029]), the liquid crystal alignment promoters represented by formula (I) in Japanese Unexamined Patent Application Publication No. 2002-129162 (particularly, the compounds disclosed in paragraphs [0076] to [0078] and [0082] to [0084]), the compounds represented by formulae (I), (II), and (III) in Japanese Unexamined Patent Application Publication No. 2005-099248 (particularly, the compounds disclosed in paragraphs [0092] to [0096]), and the following compounds;

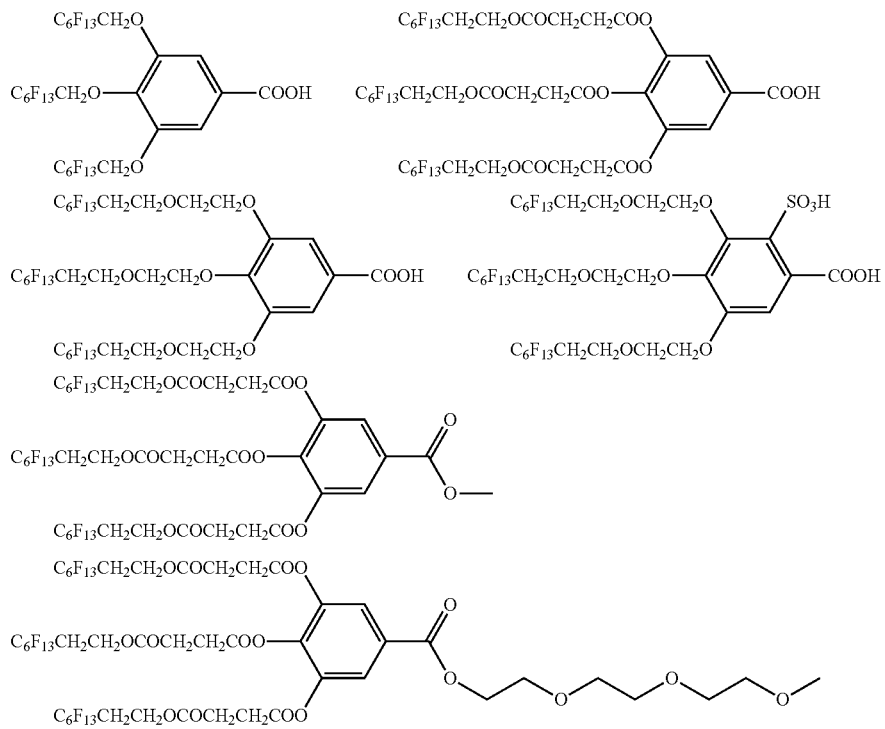

-continued
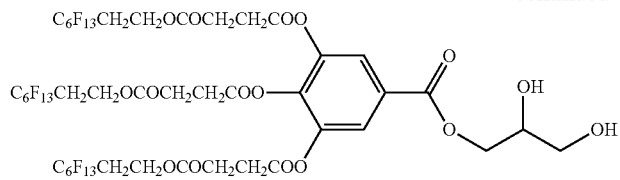
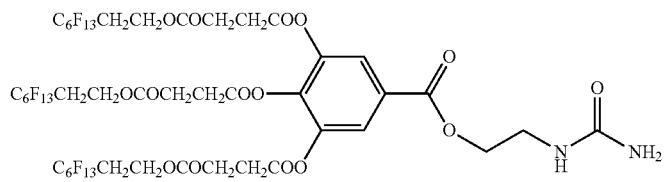
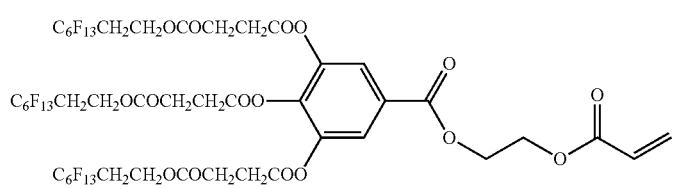
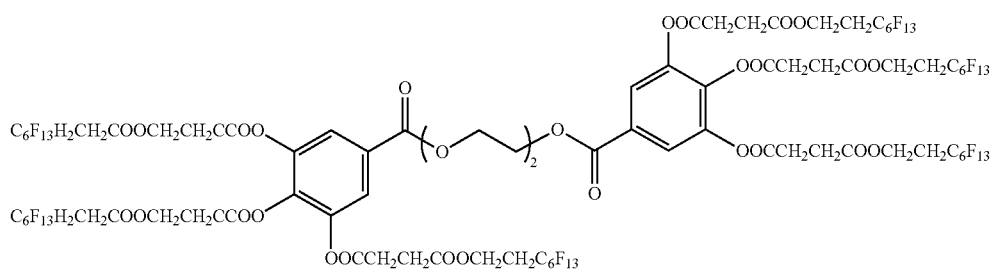
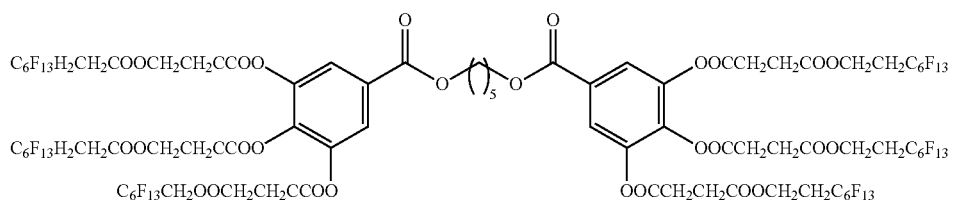
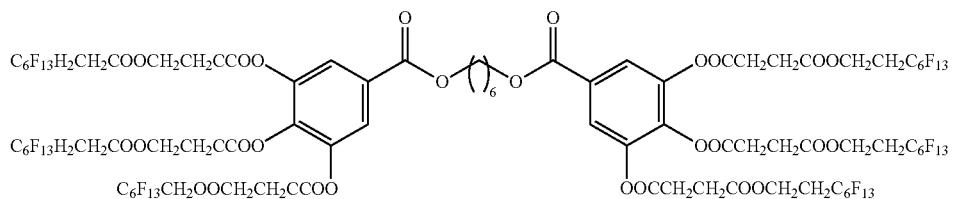
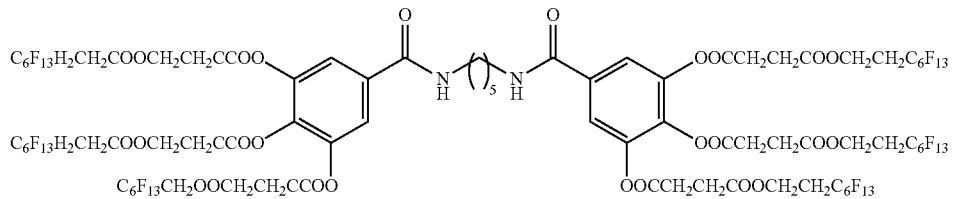
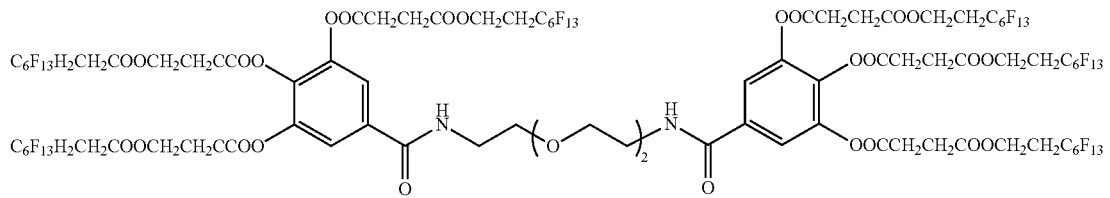

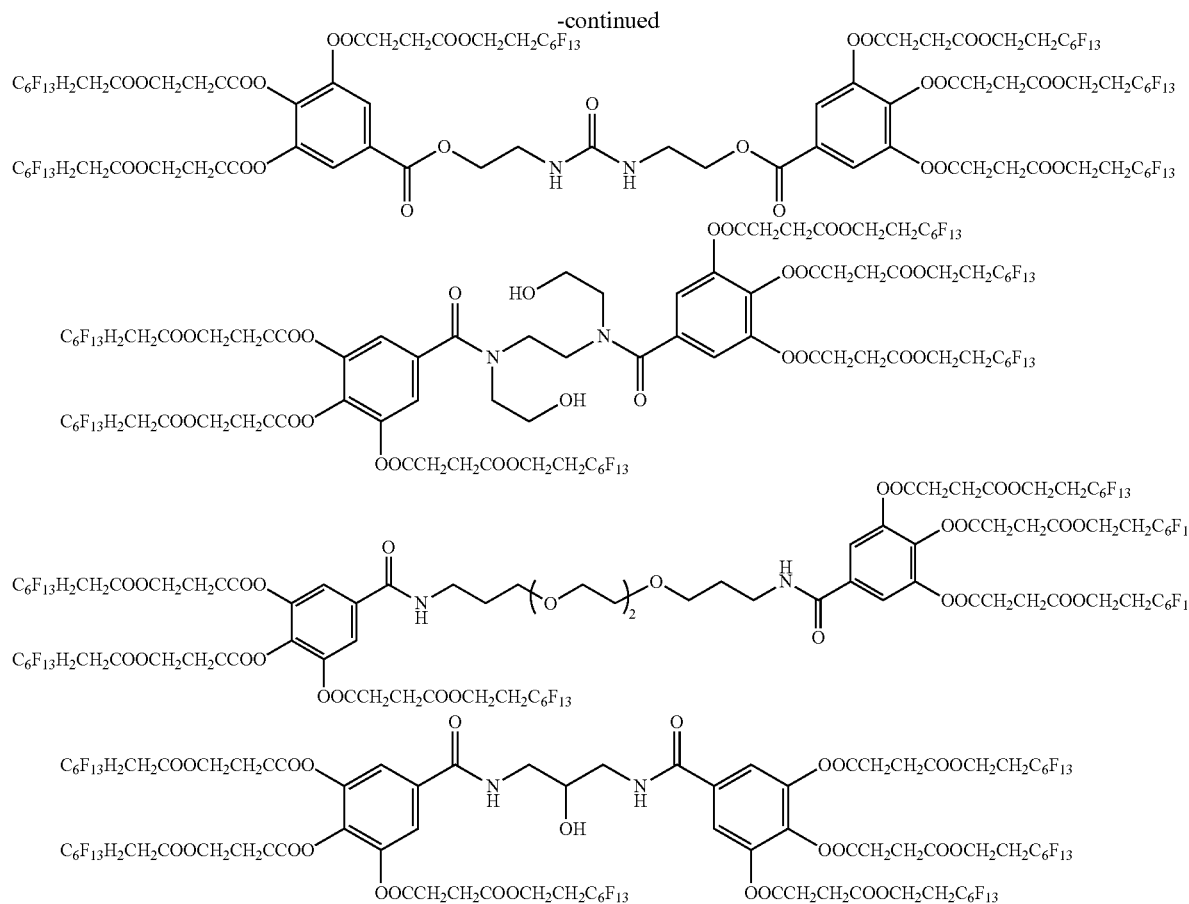

The leveling agent is preferably compounded in an amount of 0.01% to 5% by mass, more preferably 0.1% to 3% by mass, of the liquid crystal compound contained in the first optically anisotropic layer. The composition for the first optically anisotropic layer may contain one or more leveling agents. If the composition for the first optically anisotropic layer contains two or more leveling agents, the total amount thereof should preferably fall within the above range.

The composition for the first optically anisotropic layer used in the present invention may further contain a photopolymerization initiator. The composition for the first optically anisotropic layer preferably contains a photopolymerization initiator if it contains a liquid crystal having a polymerizable group or other polymerizable compounds. Examples of photopolymerization initiators include α-carbonyl compounds (such as those disclosed in the specifications of U.S. Pat. Nos. 2,367,661 and 2,367,670), acyloin ethers (such as those disclosed in the specification of U.S. Pat. No. 2,448,828), α-hydrocarbon-substituted aromatic acyloins (such as those disclosed in the specification of U.S. Pat. No. 2,722,512), polynuclear quinones (such as those disclosed in the specifications of U.S. Pat. Nos. 3,046,127 and 2,951,758), combinations of triarylimidazole dimers and p-aminophenyl ketones (such as those disclosed in the specification of U.S. Pat. No. 3,549,367), acridines and phenazines (such as those disclosed in the specifications of Japanese Unexamined Patent Application Publication No. 60-105667 and U.S. Pat. No. 4,239,850), oxadiazoles (such as those disclosed in the specification of U.S. Pat. No. 4,212,970), and acylphosphine oxides (such as those disclosed in the specifications of Japanese Examined Patent Application Publication Nos. 63-40799 and 5-29234 and Japanese Unexamined Patent Application Publication Nos. 10-95788 and 10-29997), the entire disclosure of which is incorporated herein by reference.

The photopolymerization initiator is preferably used in an amount of 0.01% to 20% by mass, more preferably 0.5% to 5% by mass, based on the solid content of the composition for the first optically anisotropic layer.

The composition used for the first optically anisotropic layer in the present invention may contain a polymerizable compound.

Any polymerizable compound may be used, in combination with the liquid crystal compound, that is compatible with the liquid crystal compound and that does not significantly change the tilt angle of the liquid crystal compound or inhibit the alignment thereof. In particular, preferred are compounds having ethylenically unsaturated groups, such as vinyl, vinyloxy, acryloyl, and methacryloyl, which have polymerization activity.

The use of a polymerizable compound having two or more reactive functional groups is particularly preferred because it can enhance the adhesion between the alignment film and the optically anisotropic layer. Although the polymerizable compound may be a polymer, it is preferably a monomer (for example, having a molecular weight of 2,000 or less).

The composition for the first optically anisotropic layer may contain one or more polymerizable compounds. The polymerizable compounds are generally present in an amount of 0.5% to 50% by mass, preferably 1% to 30% by mass, of the liquid crystal compound.

The composition for the first optically anisotropic layer may contain a solvent. The solvent is preferably an organic solvent. Preferred examples of organic solvents include amides (e.g., N,N-dimethylformamide), sulfoxides (e.g., dimethyl sulfoxide), heterocyclic compounds (e.g., pyridine), hydrocarbons (e.g., benzene and hexane), alkyl halides (e.g., chloroform and dichloromethane), esters (e.g., methyl acetate and butyl acetate), ketones (e.g., acetone, methyl ethyl ketone, and cyclohexanone), and ethers (e.g., tetrahydrofuran and 1,2-dimethoxyethane), more preferably alkyl halides and ketones. The composition for the first optically anisotropic layer may contain one or more organic solvents. The amount of solvent added is preferably adjusted such that the composition has a solid content of 10% to 50% by mass.

Japanese Unexamined Patent Application Publication Nos. 2008-225281 and 2008-026730 can be referred for further details of the method for manufacturing the first optically anisotropic layer.

Method for Manufacturing Intermediate Layer

A method for manufacturing the intermediate layer in the present invention will now be described. The intermediate layer is preferably manufactured by applying a composition, for the intermediate layer, containing a polymerizable monomer and a solvent onto a surface of the first optically anisotropic layer and then curing the monomer.

The polymerizable monomer is typically a photopolymerizable monomer, preferably a (meth)acrylate monomer. The intermediate layer is preferably formed by curing a composition containing a (meth)acrylate monomer having a ratio of the number of carbon atoms to the number of atoms other than carbon and hydrogen atoms (Y/M ratio) of 1.4 to less than 3. Preferably, the Y/M ratio is 1.8 to less than 2, more preferably 1.9 to less than 2. A photopolymerizable monomer having such a Y/M ratio more effectively provides the advantages of the present invention. The composition for the intermediate layer may contain one or more polymerizable monomers.

In particular, carbon, oxygen, and hydrogen atoms preferably constitute 95% or more, more preferably 100%, of the constituent atoms of the (meth)acrylate monomer in the present invention.

The (meth)acrylate monomer forming an intermediate layer containing a (meth)acrylic resin is preferably a combination of a compound containing one (meth)acryloyl group in one molecule and a compound containing two or more (meth)acryloyl groups in one molecule and more preferably a combination of a compound containing one (meth)acryloyl group in one molecule and a compound containing two to four (meth)acryloyl groups in one molecule.

The (meth)acrylate monomer in the present invention preferably has a molecular weight of 100 to 800 and more preferably 150 to 500.

To form an intermediate layer having polar groups, a polymerizable monomer having a polar group is preferably used.

To form an intermediate layer having polymerizable groups, a polymerizable monomer having two or more (preferably 3 or more, more preferably 3 or 4) polymerizable groups in the molecule may be used to adjust the reaction rate of the polymerizable monomer.

The composition used for the intermediate layer in the present invention preferably contains both a polymerizable monomer having a polar group and a polymerizable monomer having two or more (preferably 3 or more, more preferably 3 or 4) polymerizable groups in the molecule.

Examples of the (meth)acrylate monomer include (meth)acrylic acid diesters of alkylene glycols, (meth)acrylic acid diesters of polyoxyalkylene glycols, (meth)acrylic acid diesters of polyhydric alcohols, (meth)acrylic acid diesters of ethylene oxide or propylene oxide adducts, epoxy(meth)acrylates, urethane(meth)acrylates, and polyester(meth)acrylates.

In particular, esters of polyhydric alcohols and (meth)acrylic acid are preferred. Examples of the esters include glycerin monomethacrylate (GLM), 1,6-hexanediol acrylate, pentaerythritol tetra(meth)acrylate (PETA), pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, urethane acrylate, polyester polyacrylate, and caprolactone-modified tris(acryloxyethyl)isocyanurate.

Commercially available (meth)acrylate monomers can also be used. Examples of polyfunctional acrylates, which have (meth)acryloyl groups, include KAYARAD PET30, KAYARAD DPHA, KAYARAD DPCA-30, and KAYARAD DPCA-120 from Nippon Kayaku Co., Ltd. Examples of urethane acrylates include U-15HA, U-4HA, and UA-9300 from Shin Nakamura Chemical Co., Ltd., EB5129 from Daicel-UCB Co. Ltd., and BLEMMER GLM from NOF Corporation. Glycerol diglycerolate di(meth)acrylate monomers from Sigma-Aldrich Corporation are also preferred.

The composition for the intermediate layer preferably contains at least one solvent selected from cyclohexanone, methyl isobutyl ketone, toluene, methylcyclohexane, and methyl acetate, more preferably methyl acetate and methyl isobutyl ketone. These solvents can be used alone or in combination. The composition used for the intermediate layer preferably has a solid content of 12% to 50% by mass, more preferably 15% to 45% by mass.

In addition to polymerizable monomers and solvents, the composition used for the intermediate layer may optionally contain additives such as polymerization initiators.

Examples of polymerization initiators used in the composition for the intermediate layer include known polymerization initiators such as those that can be used in the composition for the first optically anisotropic layer.

In the present invention, after the composition for the intermediate layer is applied onto the surface of the first optically anisotropic layer, the resulting coating is preferably dried at 10° C. to 70° C., more preferably 15° C. to 60° C., even more preferably 20° C. to 50° C., further preferably 25° C. to 40° C. Drying at such temperatures improves the order parameter of the liquid crystal compound.

Method for Manufacturing Second Optically Anisotropic Layer

A method for manufacturing the second optically anisotropic layer in the present invention will now be described in detail. The second optically anisotropic layer is preferably formed by applying (typically, by coating) a composition for the second optically anisotropic layer onto a surface of the intermediate layer. As described above, an optically anisotropic layer having a desired order parameter cannot be practically manufactured even if the composition for the second optically anisotropic layer is applied onto the surface of the first optically anisotropic layer in a known manner. In the present invention, as described above, a thin film including a second optically anisotropic layer with a high degree of orientational order can be manufactured by providing a first optically anisotropic layer containing a leveling agent, which forms a smooth surface, providing a particular intermediate layer on the surface of the first optically anisotropic layer, and providing a second optically anisotropic layer on a surface of the intermediate layer.

The second optically anisotropic layer preferably contains a vertical alignment agent. The vertical alignment agent facilitates the alignment of the liquid crystal compound in the interface with the intermediate layer. The vertical alignment agent is preferably a borate compound and/or an onium salt.

Preferred examples of borate compounds include those represented by the following formula;

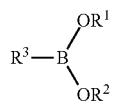

(where $R^1$ and $R^2$ are each independently hydrogen, a substituted or unsubstituted aliphatic hydrocarbon group, an aryl group, or a heterocyclic group, and $R^3$ is a substituent including a functional group that can be attached to a (meth)acrylic group).

Specific examples of borate compounds include the borate compounds represented by formula (I) in paragraphs [0023] to [0032] of Japanese Unexamined Patent Application Publication No. 2008-225281, and the borate compounds disclosed therein are preferred. Also preferred are the following borate compounds;

group; $L^2$ is a single bond or a divalent linking group; $Y^1$ is a divalent linking group including a five- or six-membered ring; Z is a divalent linking group including 2 to 20 alkylene groups; and $P^1$ and $P^2$ are each independently a monovalent substituent having a polymerizable ethylenically unsaturated group).

Specific examples of onium salts include the onium salts disclosed in paragraphs [0052] to [0058] of Japanese Unexamined Patent Application Publication No. 2012-208397, the onium salts disclosed in paragraphs [0024] to [0055] of Japanese Unexamined Patent Application Publication No. 2008-026730, and the onium salts disclosed in Japanese Unexamined Patent Application Publication No. 2002-37777, and the onium salts disclosed therein are preferred.

The vertical alignment agent is preferably present in an amount of 0.1% to 5% by mass, more preferably 0.5% to 3% by mass, of the liquid crystal compound contained in the second optically anisotropic layer. The composition for the second optically anisotropic layer may contain one or more vertical alignment agents. If the composition for the second optically anisotropic layer contains two or more vertical alignment agents, the total amount thereof should preferably fall within the above range.

The second optically anisotropic layer may be manufactured in the same manner as the first optically anisotropic layer except that the composition for the second optically anisotropic layer differs from the composition for the first

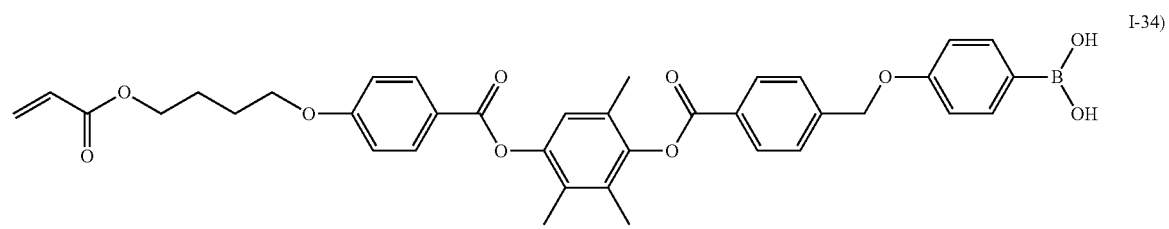

I-34)

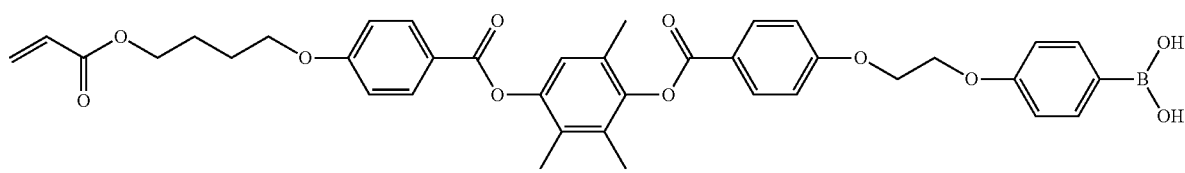

I-35)

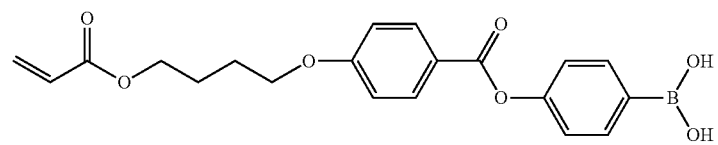

I-36)

Preferred examples of onium salts include those represented by the following formula;

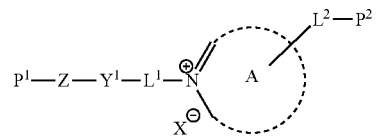

(where ring A is a nitrogen-containing heterocyclic quaternary ammonium ion; X is an anion; $L^1$ is a divalent linking optically anisotropic layer and is directly applied onto the surface of the intermediate layer.

The composition for the second optically anisotropic layer essentially contains a liquid crystal compound and optionally contains other ingredients such as polymerization initiators, polymerizable compounds, and solvents. As described above, the composition for the second optically anisotropic layer may further contain a vertical alignment agent.

The liquid crystal compound for the second optically anisotropic layer may be either a rod-like liquid crystal compound or a discotic liquid crystal compound, more preferably a rod-like liquid crystal compound.

The liquid crystal compound for the second optically anisotropic layer is preferably a liquid crystal compound that exhibits a smectic or nematic phase, more preferably a liquid crystal compound that exhibits a nematic phase.

Preferred examples of liquid crystal compounds exhibiting a smectic phase include the liquid crystal compounds described above for the composition for the first optically anisotropic layer.

Examples of compounds exhibiting a nematic phase include the compounds represented by formula (I) in Japanese Unexamined Patent Application Publication No. 2008-297210 (particularly, the compounds disclosed in paragraphs [0034] to [0039]) and the compounds represented by formula (I) in Japanese Unexamined Patent Application Publication No. 2010-84032 (particularly, the compounds disclosed in paragraphs [0067] to [0073]).

In particular, preferred in the present invention is at least one compound selected from the group consisting of compounds represented by formula (IA) and compounds represented by formula (IIA);

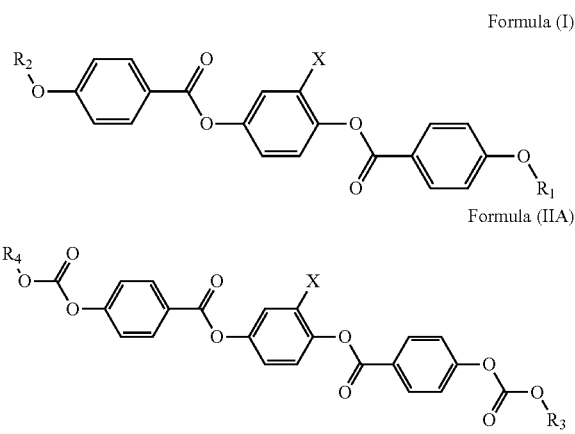

Formula (I)

Formula (IIA)

(where $R_1$ to $R_4$ are each independently —$(CH_2)_n$—OOC—CH=$CH_2$; n is an integer of 1 to 5; and X and Y are each independently hydrogen or methyl).

To inhibit crystallization, X and Y in formulae (IA) and (IIA) are preferably methyl. To achieve a compound that behaviors as a liquid crystal, n is preferably an integer of 1 to 5, more preferably 2 to 5.

The composition used for the second optically anisotropic layer in the present invention may contain one or more liquid crystal compounds. The composition for the second optically anisotropic layer may further contain other liquid crystal compounds without departing from the spirit of the present invention. For example, the composition for the second optically anisotropic layer may contain rod-like liquid crystal compounds such as azomethines, azoxies, cyanobiphenyls, cyanophenyl esters, benzoate esters, phenyl cyclohexanecarboxylates, cyanophenylcyclohexanes, cyano-substituted phenylpyrimidines, alkoxy-substituted phenylpyrimidines, phenyldioxanes, tolans, and alkenylcyclohexylbenzonitriles.

The composition for the second optically anisotropic layer preferably contains the liquid crystal compounds in an amount of 50% to 98% by mass, more preferably 70% to 95% by mass, based on the total solid content.

The composition for the second optically anisotropic layer may further contain other ingredients such as polymerization initiators, leveling agents, polymerizable compounds, and solvents. The description of the composition for the first optically anisotropic layer can be referred for further details of such ingredients, and preferred examples and contents are also as described above.

Retardation Film

A retardation film according to the present invention may consist of a first optically anisotropic layer, an intermediate layer, and a second optically anisotropic layer and may further include, for example, a support and an alignment film for forming the first optically anisotropic layer.

The support may be composed of any material. A wide range of polymer films may be used. For example, the support may be, but not limited to, a transparent support made of a polymer film with low optical anisotropy. The term "transparent support" as used herein refers to a support having a light transmittance of 80% or more. The term "low optical anisotropy" refers to a retardation in a plane (Re(550)) of, for example, 20 nm or less, preferably 10 nm or less. The transparent support may be in the form of a long roll or a final product, for example, a rectangular sheet. Preferably, the alignment film and the optically anisotropic layers are continuously formed on a roll of an elongated polymer film, serving as the support, and is cut into a desirable size.

Examples of polymer films that can be used as the support include films of cellulose acylates, polycarbonates, polysulfones, polyethersulfones, polyacrylates, polymethacrylates, and cyclic polyolefins, preferably cellulose acylate films, more preferably cellulose acetate films. The use of cellulose acylate films more effectively prevents a decrease in front contrast.

In an embodiment where the support function as a polarizing film, as described later, the polymer may be polyvinyl alcohol.

The first optically anisotropic layer, the intermediate layer, and the second optically anisotropic layer of the retardation film according to the present invention preferably have a total thickness of 0.6 to 10 μm, more preferably 1.0 to 5.0 μm, even more preferably 1.5 to 3.0 μm. Such layers provide a thinner retardation film.

The total thickness of the retardation film according to the present invention (if it serves as a protective film for a polarizing plate, the total thickness from the layer adjoining the polarizing film to the second optically anisotropic layer, e.g., the thickness of the portion 3 in FIGS. 1 to 3, described later) is preferably 40 μm or less, more preferably 35 μm or less, even more preferably 10 μm or less, further preferably 4 μm or less. In particular, the retardation film according to the present invention may have a smaller total thickness, i.e., 3 μm or less, since it can be formed without the support and the alignment film (excluding the intermediate layer). The lower limit is 0.6 μm or more, preferably 1 μm or more.

The retardation film according to the present invention is suitable for use as a protective film for a polarizing plate. The retardation film according to the present invention may be incorporated as a retardation film, in addition to a polarizing plate. In this case, the retardation film is preferably disposed between a front polarizing film and a liquid crystal cell. The retardation film may also be disposed between a rear polarizing film and the liquid crystal cell. The term "front" as used herein refers to the viewing side of a liquid crystal display.

Polarizing Plate

A polarizing plate according to the present invention includes a polarizing film and a retardation film according to the present invention on one surface of the polarizing film and may further include a protective film on the surface of the polarizing film on which the retardation film according to the present invention is not disposed. The polarizing plate according to the present invention is suitable for use as a protective film for a front polarizing plate. If the polarizing plate according to the present invention is incorporated into a liquid crystal display, the retardation film according to the present invention is preferably disposed closer to the liquid crystal cell, that is, between the front polarizing film and the liquid crystal cell.

Examples of polarizing films include iodine-containing polarizing films, dye-containing polarizing films containing dichroic dyes, and polyene-containing polarizing films. In general, iodine-containing polarizing films and dye-containing polarizing films can be manufactured from polyvinyl alcohol films.

The protective film on the surface, away from the retardation film according to the present invention, of the polarizing film is typically a polymer film. An example of such a protective film is a cellulose acylate film.

The surfaces of the protective film and the retardation film used in the present invention on which the polarizing film is to be laminated may be modified to have improved adhesiveness to the polarizing film, which is based on polyvinyl alcohol, by saponification treatment, which imparts hydrophilicity to the surfaces of the protective film and the retardation film. Such treatment is omittable if the retardation film according to the present invention is directly provided on the surface of the polarizing film.

Polarizing plates according to preferred embodiments of the present invention will now be described with reference to the drawings. It should be understood that these embodiments are not intended to limit the present invention. The following drawings are not necessarily to scale.

Figure 2:
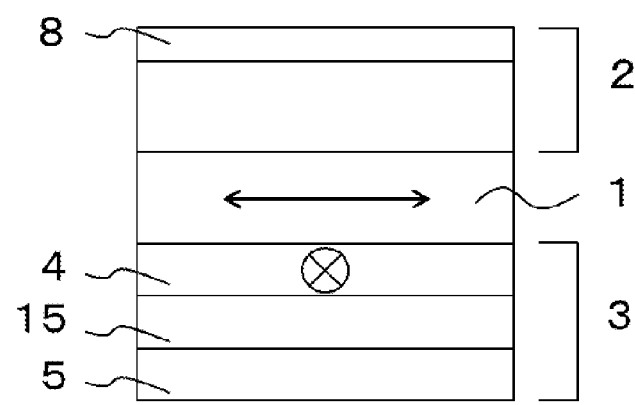
FIG. 2 is a schematic view illustrating another example retardation film according to the present invention.
Figure 3:
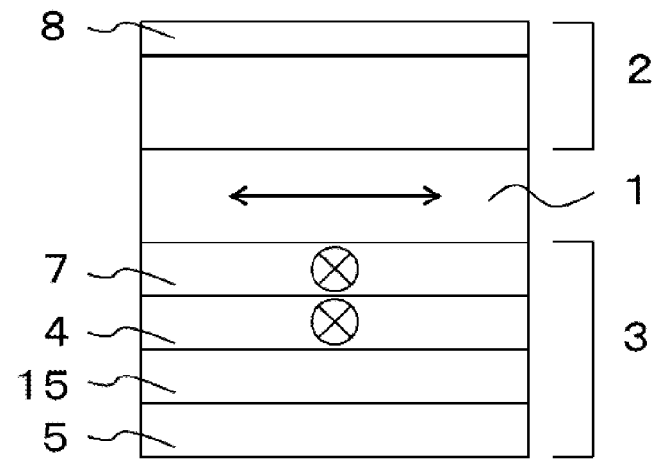
FIG. 3 is a schematic view illustrating another example retardation film according to the present invention.

FIGS. 1 to 3 illustrate example polarizing plates according to the present invention. These polarizing plates include a polarizing film 1, a protective film 2 for the polarizing film 1, and a retardation film 3 according to the present invention. The retardation film 3 includes a first optically anisotropic layer 4, a second optically anisotropic layer 5, and an intermediate layer 15 and may further include a support 6 for the retardation film 3 and an alignment film 7. In FIG. 1, the arrow in the polarizing film 1 indicates the polarization axis direction. The symbol in the first optically anisotropic layer 4 indicates the slow axis direction, meaning that it is perpendicular to the arrow in the polarizing film 1. The arrow in the alignment film 7 indicates the rubbing direction of the alignment film 7. This also applies to the subsequent figures.

In the embodiment illustrated in FIG. 1, the protective film 2 is laminated on one surface of the polarizing film 1, and the retardation film 3 according to the present invention is laminated on the other surface of the polarizing film 1. The protective film 2 and the retardation film 3 can be laminated with various types of adhesives, including glues, pressure-sensitive adhesives, and pastes (no adhesive layer is depicted).

The retardation film 3 illustrated in FIG. 1 includes the alignment film 7 on one surface of the support 6 and, in sequence, the first optically anisotropic layer 4, the intermediate layer 15, and the second optically anisotropic layer 5 on a surface of the alignment film 7. The rubbing direction of the alignment film 7 is preferably perpendicular to the longitudinal direction of the polarizing film 1.

The retardation film 3 illustrated in FIG. 2 includes the protective film 2 on one surface of the polarizing film 1 and, directly in sequence, the first optically anisotropic layer 4, the intermediate layer 15, and the second optically anisotropic layer 5 on the other surface of the polarizing film 1. The retardation film 3 illustrated in FIG. 2 is significantly thin because it consists only of the first optically anisotropic layer 4, the intermediate layer 15, and the second optically anisotropic layer 5.

In the embodiment illustrated in FIG. 2, the surface of the polarizing film 1 on which the first optically anisotropic layer 4 is to be formed is preferably rubbed. In FIG. 2, a hard coat layer 8 is disposed on a surface of the protective film 2.

The hard coat layer 8 is preferably a cured layer of a polymerizable compound. For example, the hard coat layer 8 may be a cured layer of a composition containing a polyfunctional (meth)acrylate, a polymerization initiator, and a solvent. The hard coat layer 8 preferably has a thickness of about 1 to 10 μm. Such a hard coat layer 8 protects a thinner protective film 2 from scratches. Alternatively, the hard coat layer 8 may be directly disposed on the polarizing film 1 without the protective film 2 therebetween to provide a thinner polarizing plate unless any problem occurs, for example, in terms of manufacture.

The retardation film 3 illustrated in FIG. 3 includes the protective film 2 on one surface of the polarizing film 1, the alignment film 7 on the other surface of the polarizing film 1, and the first optically anisotropic layer 4, the intermediate layer 15, and the second optically anisotropic layer 5 on a surface of the alignment film 7. The rubbing direction of the alignment film 7 is preferably perpendicular to the longitudinal direction of the polarizing film 1. In FIG. 3, the hard coat layer 8 is disposed on a surface of the protective film 2.

Liquid Crystal Display

The present invention also relates to a liquid crystal display including a retardation film or polarizing plate according to the present invention. The liquid crystal display may be used in any mode of operation. For example, the liquid crystal display may be used in a twisted nematic (TN) mode, an optically compensated bend (OCB) mode, or avertical alignment (VA) mode. In particular, the liquid crystal display is preferably used in a transverse-electric mode such as an IPS mode, a fringe-field-switching (FFS) mode, or a plane-to-line switching (PLS) mode (which may hereinafter be referred to as "IPS mode" as a typical example). The liquid crystal display may be a transmissive liquid crystal display, a reflective liquid crystal display, or a transflective liquid crystal display.

The usable IPS (hereinafter, also referred to as an IPS mode) liquid crystal displays are described in, for example, Japanese Patent Laid-Open Nos. 2003-15160, 2003-75850, 2003-295171, 2004-12730, 2004-12731, 2005-106967, 2005-134914, 2005-241923, 2005-284304, 2006-189758, 2006-194918, 2006-220680, 2007-140353, 2007-178904, 2007-293290, 2007-328350, 2008-3251, 2008-39806, 2008-40291, 2008-65196, 2008-76849, and 2008-96815.

The FFS (hereinafter, also referred to as an FFS mode) liquid crystal displays includes a counter electrode and a pixel electrode. These electrodes are formed of transparent materials, such as ITO, with a width so that all of the components such as liquid crystal molecules arrayed above the electrodes can be driven between a space narrower than the distance between the upper and lower substrates. This structure allows an FFS mode to have an aperture ratio higher than that of an IPS. In addition, the electrodes have optical transparency; hence, the FFS mode can have a transmittance higher than that of the IPS mode. The FFS liquid crystal cell is described in, for example, Japanese Patent Laid-Open Nos. 2001-100183, 2002-14374, 2002-182230, 2003-131248, and 2003-233083.

Figure 4:
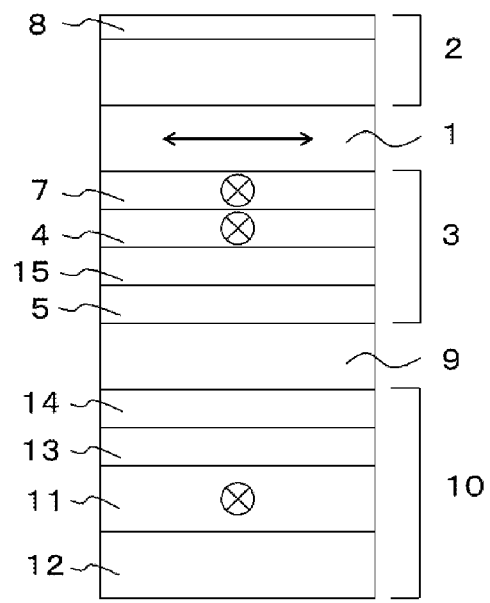
FIG. 4 is a schematic view illustrating an example liquid crystal display according to the present invention.

FIG. 4 illustrates an example liquid crystal display according to the present invention. The layers 1 to 8 and 15 in FIG. 4 are identical to those in FIGS. 1 to 3; the description on FIG. 3 can be referred for further details. The liquid crystal display illustrated in FIG. 4 further includes a liquid crystal cell 9 and a rear polarizing plate 10. The rear polarizing plate 10 includes a rear polarizing film 11, a protective film 12 for the rear polarizing film 11, an alignment film 13, and an optically anisotropic layer 14 (optical film). The absorption axis of the front polarizing film 1 is perpendicular to that of the rear polarizing film 11. In the liquid crystal display illustrated in FIG. 4, the optically anisotropic layer 14 is disposed between the rear polarizing film 11 and the liquid crystal cell 9. The optically anisotropic layer 14 can be formed, for example, by providing the alignment film 13 on a surface of the rear polarizing film 11 and then applying and curing a composition for the optically anisotropic layer 14 on a surface of the alignment film 13. In the embodiment illustrated in FIG. 4, the optically anisotropic layer 14 preferably has a retardation in a plane at a wavelength of 550 nm (Re(550)) of 30 to 120 nm and a retardation across the thickness at a wavelength of 550 nm (Rth(550)) of 20 to 100 nm. More preferably, the optically anisotropic layer 14 is an optically anisotropic layer containing an obliquely aligned liquid crystal compound. In this case, the liquid crystal compound is preferably aligned at the same angle and in the same tilt direction as the pretilted drive liquid crystal in the liquid crystal cell 9, i.e., −1.5° to 3°. The liquid crystal compound is preferably a rod-like liquid crystal compound. The optically anisotropic layer 14 may contain one or more rod-like liquid crystal compounds. Like the liquid crystal compound in the present invention, these liquid crystal compounds preferably have a high degree of orientational order.

The optically anisotropic layer 14 disposed on the rear side compensates for the optical characteristics of the rear polarizing film 11 and thereby compensates for the birefringence component of each member other than the optically anisotropic layers in the liquid crystal display, thus providing a liquid crystal display with excellent color and vertical symmetry.

As used herein, symbol Re(λ) refers to the retardation in a plane at a wavelength λ (nm), and symbol Rth(λ) refers to the retardation across the thickness at a wavelength λ (nm). Re(λ) is measured by irradiating a film with light having a wavelength λ (nm) in the normal direction with a KOBRA 21ADH or KOBRA WR birefringence analyzer (from Oji Scientific Instruments). The measurement wavelength λ (nm) may be selected by manually replacing a wavelength selective filter or converting the measurements, for example, with software. If the film for measurement has a uniaxial or biaxial optical indicatrix, Rth(λ) is calculated through the following procedure.

When a film to be analyzed is expressed by a monoaxial or biaxial index ellipsoid, Rth (λ) of the film is calculated as follows. Rth (λ) is calculated by KOBRA 21ADH or WR on the basis of the six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the Rth(λ) of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (A) and (III);

$$Re(\theta) = \left[ nx - \frac{(ny \times nz)}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad \text{formula (A)}$$

Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$Rth=\{(nx+ny)/2-nz\}\times d \quad (III)$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main retardation films are listed below:

cellulose acylate (1.48), cycloolefin polymer (1.52), polycarbonate (1.59), polymethylmethacrylate (1.49) and polystyrene (1.59).

The instrument KOBRA-21ADH or KOBRA-WR calculates nx, ny, and nz, through input of the assumed average refractive index and the film thickness, and then calculates Nz=(nx−nz)/(nx−ny) on the basis of the calculated nx, ny, and nz.

Re and Rth are measurements at a wavelength of 550 nm, which falls within the visible range, unless otherwise stated.

EXAMPLES

Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

Preparation of Polarizing Plate Protective Film Provided with Hard Coat Layer

Preparation of Polarizing Plate Protective Film

The following composition was placed and stirred in a mixing tank until the individual components were dissolved to prepare a cellulose acetate dope for a core layer.

| | |
|---|---|
| Cellulose acetate (degree of acetyl substitution: 2.88) | 100 parts by mass |
| Ester oligomer | 10 parts by mass |
| Durability improver | 4 parts by mass |
| Ultraviolet absorber | 3 parts by mass |
| Methylene chloride (first solvent) | 438 parts by mass |
| Methanol (second solvent) | 65 parts by mass |

Ester Oligomer (molecular weight: 1,000) (where n is an integer of 1 to 10)

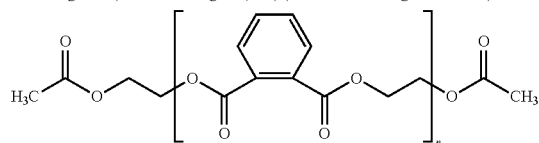

Durability Improver

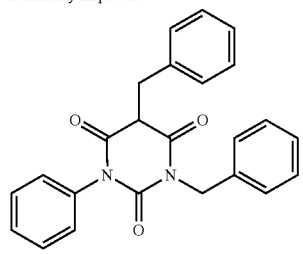

Ultraviolet Absorber

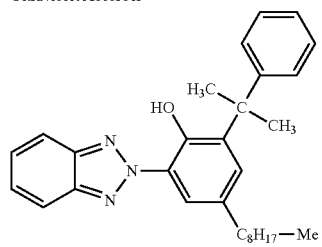

Preparation of Cellulose Acylate Dope for Outer Layer

To 90 parts by mass of the above cellulose acylate dope for a core layer, 10 parts by mass of the following matting agent solution was added to prepare a cellulose acetate dope for an outer layer.

| | |
|---|---|
| Silica particles with average particle size of 20 nm (AEROSIL R972 from Nippon Aerosil Co., Ltd.) | 2 parts by mass |
| Methylene chloride (first solvent) | 76 parts by mass |
| Methanol (second solvent) | 11 parts by mass |
| Cellulose acylate dope for core layer | 1 part by mass |

Preparation of Cellulose Acylate Film A

One layer of the cellulose acylate dope for a core layer and two layers of the cellulose acylate dope for an outer layer on both sides thereof were simultaneously cast from the respective outlets onto a drum at 20° C. The resulting laminate film was stripped at a solvent content of about 20% by mass, was fixed with tenter clips at both ends along the width, and was dried while being stretched to 1.2 times in the transverse direction at a residual solvent content of 3% to 15% by mass. Subsequently, the film was transported through rollers in a heating apparatus to form a cellulose acylate film having a thickness of 25 μm (cellulose acylate film A).

Preparation of Hard Coat Layer

The following hard coat composition 1 was applied onto one surface of the cellulose acylate film A prepared as described above, was dried at 100° C. for 60 seconds, and was cured by ultraviolet irradiation at 1.5 kW and 300 mJ in an atmosphere containing 0.1% or less nitrogen to prepare a hard coat layer having a thickness of 5 μm. The hard coat composition was applied by die coating from a slot die, and the coating thickness was adjusted by controlling the amount of hard coat composition applied.

Hard Coat Composition 1

| | |
|---|---|
| Pentaerythritol triacrylate/pentaerythritol tetraacrylate (in a mass ratio of 3:2) | 53.5 parts by mass in total |
| Photopolymerization initiator J3 | 1.5 parts by mass |
| Ethyl acetate | 100 parts by mass |

Photopolymerization Initiator J3

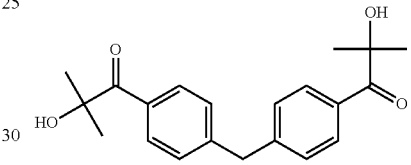

Saponification of Film

The resulting cellulose acylate film A provided with the hard coat layer was dipped in a 4.5 mol/L aqueous sodium hydroxide solution (saponification solution) at 37° C. for 1 minute and was rinsed with water. The film was then dipped in a 0.05 mol/L aqueous sulfuric acid solution for 30 seconds and was passed through a water bath. After an air knife was applied three times to remove residual water, the film was dried in a drying zone at 70° C. for 15 seconds. A saponified film was prepared.

Preparation of Polarizing Film

A polarizing film having a width of 1,330 mm in the longitudinal direction and a thickness of 15 μm was prepared as in Example 1 of Japanese Unexamined Patent Application Publication No. 2001-141926, specifically, by stretching a film in the longitudinal direction through two pairs of nip rollers rotating at different rim speeds.

Lamination

The polarizing film prepared as described above and the saponified film were laminated together by a roll-to-roll process with a 3% aqueous polyvinyl alcohol (PVA-117H from Kuraray Co., Ltd.) adhesive. During this process, the side, away from the hard coat layer, i.e., adjacent to the cellulose acylate film A, of the film was laminated on the polarizing film such that the polarization axis was perpendicular to the longitudinal direction of the cellulose acylate film A. A polarizing film provided on one side with the protective film was prepared.

Preparation of Alignment Film

In a 75:25 (by mass) mixture of water and methanol, 100 parts by mass of a compound (polyvinyl alcohol 1) composed of the constituents represented by the following formulae and 5 parts by mass of the compound represented by formula T1 below were dissolved into a concentration of 4.0% by mass to prepare a composition for a polyvinyl alcohol layer. This solution was applied onto a surface of the polarizing film provided on one side with the protective film with a wire bar coater (No. 8) and was dried at 60° C. for 0.5 minute. The resulting polyvinyl alcohol layer had a thickness of 0.25 μm.

Formulae of Constituents of Polyvinyl Alcohol

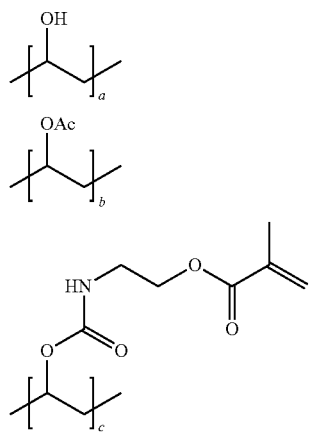

In the formulae representing the constituents of polyvinyl alcohol 1, a is 96, b is 2, and c is 2.

T1

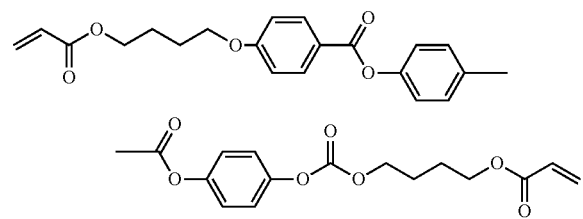

Rubbing Treatment

The resulting protective film provided with the PVA layer was transported while a surface of the PVA layer was rubbed perpendicular to the longitudinal direction of the cellulose acylate film A to form an alignment film.

Preparation of First Optically Anisotropic Layer

The following composition for the first optically anisotropic layer was dissolved in an 86:14 (by mass) mixture of methyl ethyl ketone and cyclohexanone into a concentration of 30% by mass.

| Liquid crystal compound (α or β in Table 4) | 100 parts by mass |
| Polymerization initiator J1 | 3 parts by mass |
| Polymerization initiator J2 | 1 part by mass |
| Acrylate monomer A1 | 5 parts by mass |
| Liquid Crystal α | |

| Compound B03 (see below) | 80 parts by mass |

The liquid crystal α had an NI point of 145° C. and exhibited a nematic phase.

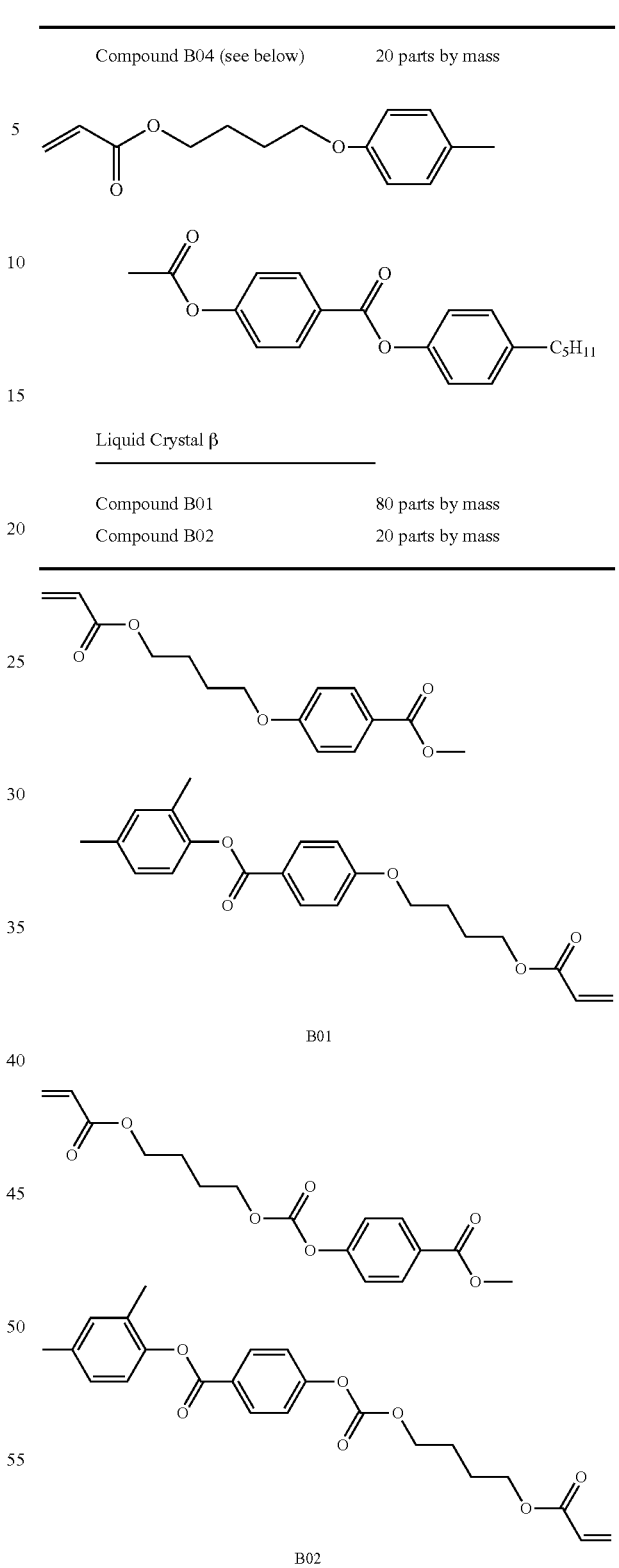

| Compound B04 (see below) | 20 parts by mass |

| Liquid Crystal β | |
| Compound B01 | 80 parts by mass |
| Compound B02 | 20 parts by mass |

The liquid crystal β had an NI point of 120° C. and exhibited a nematic phase.

Liquid Crystal ε

Compound A disclosed in paragraph [0161] of Japanese Unexamined Patent Application Publication No. 2010-084032 was used.

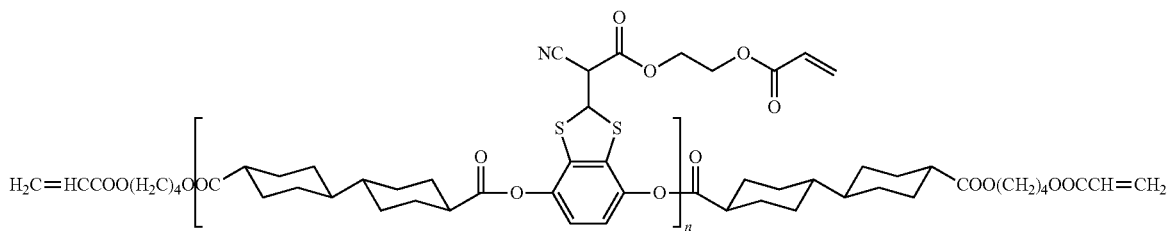

Cry 100° C. N 250° C. or more.
Leveling Agent A

| | |
|---|---|
| Leveling agent R1 | 0.8 part by mass |
| Leveling agent R2 | 0.05 part by mass |

Leveling Agent B

| | |
|---|---|
| Leveling agent R3 | 0.8 part by mass |

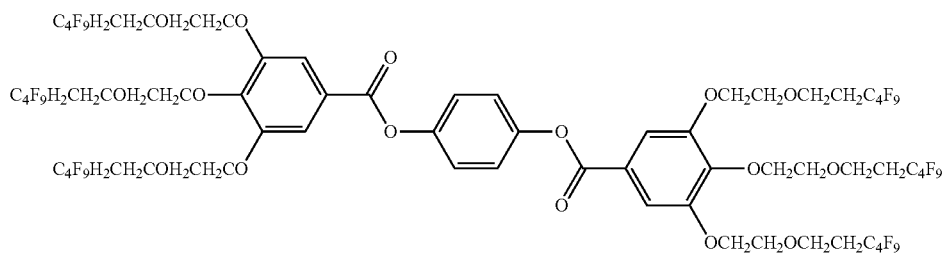

Leveling Agent R1

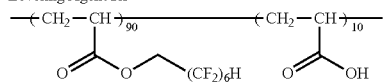

Leveling Agent R2

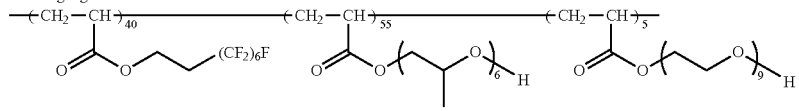

Polymerization Initiator J1

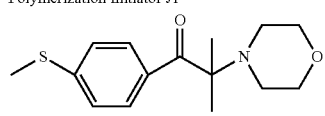

Polymerization Initiator J2

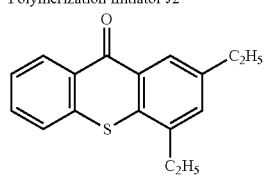

Acrylate Monomer A1

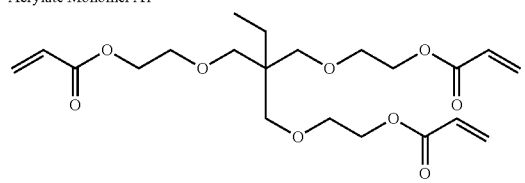

The above composition for the first optically anisotropic layer was applied with a wire bar coater selected depending on the thickness and was dried at 70° C. for 2 minutes to align the rod-like liquid crystal compound (homogeneous alignment). After being cooled to 40° C., the resulting coating was cured by ultraviolet irradiation at an intensity of 190 mW/cm$^2$ and a dose of 150 mJ/cm$^2$ with an air-cooled metal halide lamp having a power of 160 W/cm (from Eye Graphics Co., Ltd.) in a nitrogen purge atmosphere containing about 0.1% oxygen. The cured layer was then spontaneously cooled to room temperature. The thickness of the resulting first optically anisotropic layer is shown in Table 4.

A homogeneously aligned state was determined by confirming that light disappeared when the alignment axis direction was aligned with the absorption axis of the polarizing film in a crossed nicol state (0°, 90°) under a polarizing microscope and the luminance varied at the angles therebetween and was maximized in the 45° direction.

Preparation of Intermediate Layer (Acrylic 1)

A mixture of 33 parts by mass of acrylic compound ACR1 and 67 parts by mass of acrylic compound ACR2, i.e., a total of 100 parts by mass, was prepared. To the mixture were added 4 parts by mass of a photopolymerization initiator (IRGACURE 127 from Ciba Specialty Chemicals, Inc.) and a solvent (50:50 (by mass) mixture of methyl acetate and cyclohexanone). The mixture was adjusted into a solid content of 30% by mass to prepare a composition for the intermediate layer. The resulting composition for the intermediate layer was applied onto a surface of the first optically anisotropic layer with a wire bar coater (No. 2.4) selected depending on the thickness, was dried at 60° C. for 0.5 minute, and was crosslinked by UV irradiation with a high-pressure mercury lamp having a power of 120 W/cm at 30° C. for 30 seconds.

The SP values of the individual materials were calculated by Hoy's method and were averaged to determine the SP value of the resin.

ACR1: BLEMMER GLM from NOF Corporation, represented by the following formula:

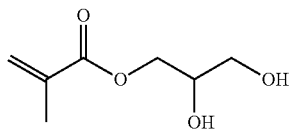

ACR2: KAYARAD PET30 from Nippon Kayaku Co., Ltd., represented by the following formula (50:50 (by mass) mixture of pentaerythritol triacrylate and pentaerythritol tetraacrylate):

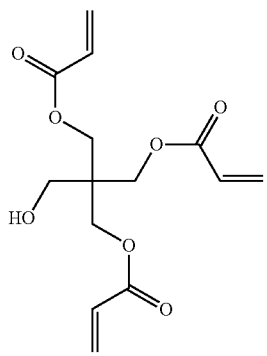

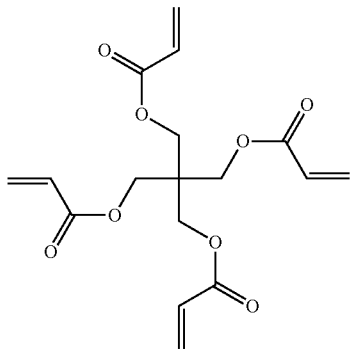

Preparation of Intermediate Layer (Acrylic 2)

The procedure of the preparation of the intermediate layer (Acrylic 1) was repeated except that ACR1 and ACR2 were replaced with an equal amount of ACR3 (from Sigma-Aldrich Corporation). ACR3

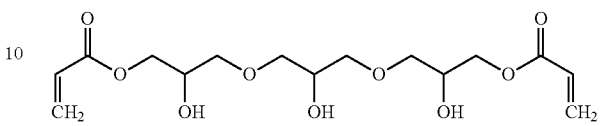

Preparation of Intermediate Layer (Acrylic 3)

The procedure of the preparation of the intermediate layer (Acrylic 1) was repeated except that ACR2 was replaced with an equal amount of ACR1, that is, ACR1 was used alone as the monomer.

Preparation of Intermediate Layer (Acrylic 4)

The procedure of the preparation of the intermediate layer (Acrylic 1) was repeated except that ACR1 and ACR2 were replaced with an equal amount of pentaerythritol tetraacrylate.

Preparation of Intermediate Layer (Alignment Film 5)

The PVA (PVA1) represented by the formulae described above for the preparation of the alignment film and glycerol monomethacrylate (BLEMMER GLM from NOF Corporation) were mixed in a mass ratio of 1:9. The mixture was dissolved in a 75:25 (by mass) mixture of water and methanol into a concentration of 4.0% by mass to prepare a composition for the alignment film 5. The resulting composition for the alignment film 5 was applied onto the saponified surface with a wire bar coater (No. 8) and was dried at 60° C. for 0.5 minute to form the alignment film. 5. The SP values of the individual materials were calculated by Hoy's method and were averaged to determine the SP value of the resin.

Preparation of Intermediate Layer (Acrylic 6)

The procedure of the preparation of the intermediate layer (Acrylic 1) was repeated except that ACR1 and ACR2 were replaced with an equal amount of a 3:7 (by mass) mixture of allyl α-D-galactopyranoside and pentaerythritol acrylate.

Preparation of Intermediate Layer (PVA)

Ina 75:25 (by mass) mixture of water and methanol, 100 parts by mass of the PVA (PVA1) represented by the formulae described above for the preparation of the alignment film and 5 parts by mass of the compound represented by formula T1 were dissolved into a concentration of 4.0% by mass to prepare a composition for a PVA layer. The resulting composition for a PVA layer was applied onto a surface of the first optically anisotropic layer with a wire bar coater (No. 8) selected depending on the thickness and was dried at 60° C. for 0.5 minute. The resulting PVA layer had a thickness of 0.25 μm.

The average SP value determined from the SP values of the individual materials calculated by Hoy's method was 26.4.

Preparation of Second Optically Anisotropic Layer

The following composition for the second optically anisotropic layer was dissolved in an 86:14 (by mass) mixture of methyl ethyl ketone and cyclohexanone and was adjusted into a solid content of 30% by mass.

| | |
|---|---|
| Liquid crystal compound (α, β, or γ in Table 4) | 100 parts by mass |
| Polymerization initiator J1 | 3 parts by mass |
| Polymerization initiator J2 | 1 part by mass |
| Leveling agent R1 | 0.4 part by mass |
| Leveling agent R2 | 0.05 part by mass |
| Acrylate monomer A1 | 5 parts by mass |
| Vertical alignment agent S1 | 1 part by mass |
| Vertical alignment agent S2 | 0.5 part by mass |
| Liquid Crystal γ | |
| Compound B01 | 60 parts by mass |
| Compound B02 | 20 parts by mass |
| Compound B05 | 20 parts by mass |

Liquid Crystal Compound B05

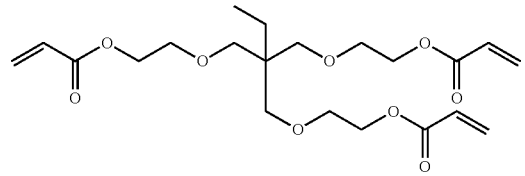 [SMILES: C=CC(=O)OCCOCC(CC)(COCCOC(=O)C=C)COCCOC(=O)C=C]

Vertical Alignment Agent S1

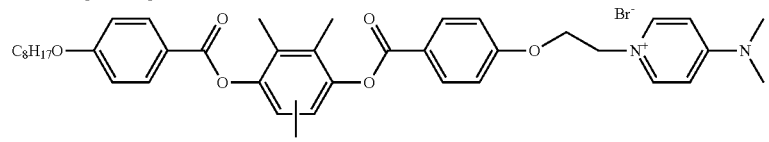

Vertical Alignment Agent S2

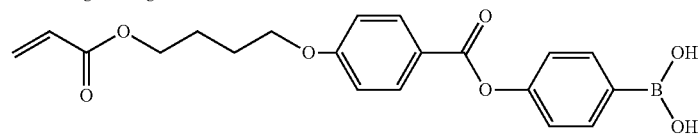

The composition for the second optically anisotropic layer was applied with a wire bar coater selected depending on the thickness and was heated in a thermostatic bath at 100° C. for 2 minutes to align the rod-like liquid crystal compound (homeotropic alignment). After being cooled to 40° C., the resulting coating was cured by ultraviolet irradiation at an intensity of 190 mW/cm² and a dose of 300 mJ/cm² with an air-cooled metal halide lamp having a power of 160 W/cm (from Eye Graphics Co., Ltd.) in a nitrogen purge atmosphere containing about 0.1% oxygen. The cured layer was spontaneously cooled to room temperature.

Fabrication of Liquid Crystal Display A

Preparation of Liquid Crystal Cell

A liquid crystal panel was detached from an iPad (trade name of Apple Inc.) equipped with an IPS liquid crystal cell. The polarizing plates disposed on the front side (display side) and the rear side (backlight side) of the liquid crystal cell were removed, and the front glass surface of the liquid crystal cell was cleaned.

Preparation of Rear Polarizing Plate

One surface of a zero-retardation cellulose triacetate (TAC) film (ZRF25 from Fujifilm Corporation) and one surface of a FUJITAC TD60UL film (from Fujifilm Corporation) having a thickness of 60 μm were alkali-saponified in the same manner as described above. The alkali-saponified surfaces of these films are laminated on a polyvinyl alcohol polarizing film having a thickness of 17 μm with a 3% aqueous PVA (PVA-117H from Kuraray Co., Ltd.) adhesive to prepare a rear polarizing plate.

The polarizing plate according to the present invention was laminated on the front side, i.e., the display side, of the IPS liquid crystal cell, and the rear polarizing plate was laminated on the other side thereof. The front polarizing plate was laminated such that the optically anisotropic layer was closer to the liquid crystal cell, whereas the rear polarizing plate was laminated such that the ZRF25 was closer to the liquid crystal cell. An IPS liquid crystal display (LCD) was fabricated. The LCD was mounted on the iPad from which the liquid crystal cell was detached.

Fabrication of Liquid Crystal Display B

Preparation of Liquid Crystal Cell

A liquid crystal panel was detached from an iPad (trade name of Apple Inc.) equipped with an IPS liquid crystal cell. The polarizing plates disposed on the front side (display side) and the rear side (backlight side) of the liquid crystal cell were removed, and the front glass surface of the liquid crystal cell was cleaned.

Preparation of Rear Polarizing Plate

Preparation of Polarizing Plate Protective Film

A cellulose acylate film A was prepared as in the preparation of the polarizing plate protective film described above.

Saponification of Cellulose Acylate Film

The resulting cellulose acylate film A was dipped in a 4.5 mol/L aqueous sodium hydroxide solution (saponification solution) at 37° C. for 1 minute and was rinsed with water. The film was then dipped in a 0.05 mol/L aqueous sulfuric acid solution for 30 seconds and was passed through a water bath. After an air knife was applied three times to remove residual water, the film was dried in a drying zone at 70° C. for 15 seconds. A saponified film was prepared.

Preparation of Polarizing Film

A polarizing film having a width of 1,330 mm and a thickness of 15 μm was prepared as in Example 1 of Japanese Unexamined Patent Application Publication No. 2001-141926, specifically, by stretching a film in the longitudinal direction through two pairs of nip rollers rotating at different peripheral speeds.

Lamination

The polarizing film prepared as described above and the saponified film were laminated together by a roll-to-roll process with a 3% aqueous polyvinyl alcohol (PVA-117H from Kuraray Co., Ltd.) adhesive such that the polarization axis was perpendicular to the longitudinal direction of the cellulose acylate film. A polarizing plate provided on one side with a protective film was prepared.

Formation of Alignment Film

A polyvinyl alcohol layer was formed on the surface of the polarizing film on which no protective film was laminated as in the layer structure a. A surface of the polyvinyl alcohol layer was continuously rubbed in the film transport direction.

Formation of Optically Anisotropic Layer

The following composition for the optically anisotropic layer was applied onto the rubbed surface with a wire bar coater. The resulting coating was heated at a film temperature of 60° C. for 60 seconds and was then cured by ultraviolet irradiation in air with an air-cooled metal halide lamp having a power of 20 mW/cm$^2$ (from Eye Graphics Co., Ltd.) to form an optically anisotropic layer in which the aligned state was fixed. In the resulting optically anisotropic layer, the rod-like liquid crystal compound was horizontally aligned such that the slow axis direction was parallel to the rubbing direction. The thickness of the optically anisotropic layer was 1.0 μm. The dependence of Re on light incident angle and the tilt angle of the optical axis were measured with an automatic birefringence analyzer (KOBRA-21ADH from Oji Scientific Instruments). Re at a wavelength of 550 nm was 60 nm, Rth at a wavelength of 550 nm was 30 nm, and the tilt angle of the optical axis was 2°.

| Composition of Coating Solution for Optically Anisotropic Layer | |
|---|---|
| Rod-like liquid crystal compound B01 | 90 parts by mass |
| Rod-like liquid crystal compound B02 | 10 parts by mass |
| Photopolymerization initiator (IRGACURE 907 from Ciba Specialty Chemicals, Inc.) | 3.0 parts by mass |
| Sensitizer (KAYACURE DETX from Nippon Kayaku Co., Ltd.) | 1.0 part by mass |
| Fluorine-containing compound (see below) | 0.5 part by mass |
| Methyl ethyl ketone | 400 parts by mass |

Fluorine-Containing Compound

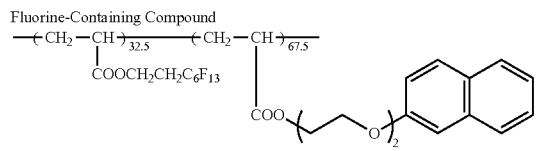

Fabrication of Liquid Crystal Display

The polarizing plate according to the present invention was laminated on the front side, i.e., the display side, of the IPS liquid crystal cell, and the rear polarizing plate was laminated on the other side thereof. The front polarizing plate was laminated such that the optically anisotropic layer was closer to the liquid crystal cell, whereas the rear polarizing plate was laminated such that the ZRF25 was closer to the liquid crystal cell. An IPS liquid crystal display (LCD) was fabricated. The LCD was mounted on the iPad from which the liquid crystal cell was detached.

Evaluations

The display performance was measured with a commercially available liquid crystal viewing angle and chromaticity measurement system (Ezcom from ELDIM, Inc.) and a backlight diverted from a commercially available liquid crystal display (iPad from Apple Inc.).

Measurement of Degree of Depolarization

An optical system was constructed that included a light source of an iPad, a polarizing film, a retardation film, an analyzer, and a photodetector (SR-UL1R from Topcon Corporation). The absorption axis of the polarizing film was perpendicular to the slow axis of the retardation film. To measure the degree of depolarization in front, the polarizing film, the retardation film, the analyzer, and the photodetector were arranged in the normal direction of the light source. The minimum luminance Lmin and the maximum luminance Lmax were measured by rotating the analyzer. The minimum luminance $L_0$ min and the maximum luminance $L_0$ max in a blank state, i.e., without the retardation film, were also measured by rotating the analyzer. The degree of depolarization was calculated by the following equation;

Degree of depolarization=$L$ min/$L$ max−$L_0$ min/$L_0$ max where Lmin is the minimum luminance of light passing through a retardation film disposed between two polarizing plates in a crossed nicol state; Lmax is the maximum luminance of light passing through a retardation film disposed between two polarizing plates in a parallel nicol state; $L_0$ min is the minimum luminance of light passing through two polarizing plates in a crossed nicol state; and $L_0$ max is the maximum luminance of light passing through two polarizing plates in a parallel nicol state.

To measure the degree of depolarization in a tilted direction, the polarizing film and the retardation film were disposed in the normal direction of the light source, and the analyzer and the photodetector were disposed on a line tilted at an angle of 50° toward the absorption axis direction of the polarizing film. The minimum luminance and the maximum luminance were measured by rotating the analyzer. The degree of depolarization in a tilted direction was calculated by the same calculation equation as that in front.

Measurement of Order Parameter

Each of the compositions containing the liquid crystal compounds described above was mixed with a dichroic dye in an amount of 1% by mass of the liquid crystal compound.

As in the procedure described above, a polyvinyl alcohol layer was formed and was rubbed in a direction perpendicular to the longitudinal direction of the polyvinyl alcohol layer to fabricate a polyvinyl alcohol alignment film. The composition containing the dichroic dye was applied to the surface of the resulting alignment film by spin casting (at 2,500 rpm). The resulting layer was dried at the same temperature. The resulting film was examined with an absorption spectrometer as follows.

The spectra (absorbances) of the liquid crystal compound in the resulting film for light polarized perpendicular to the alignment direction and for light polarized parallel to the alignment direction were measured. The polarized absorption spectrum (absorbance) of quartz glass was also measured. The polarized absorption spectrum of quartz glass in the perpendicular direction was subtracted from the polarized absorption spectrum of the liquid crystal compound in the perpendicular direction to determine $A_\perp$. The polarized absorption spectrum of quartz glass in the parallel direction was subtracted from the polarized absorption spectrum of the liquid crystal compound in the parallel direction to determine $A_\parallel$.

These values were substituted into the equation OP=$(A_\parallel - A_\perp)/(2A_\perp + A_\parallel)$ to determine the order parameter. The optically anisotropic layers containing the dichroic dye were formed using substantially the same materials in substantially the same manners as the optically anisotropic layers formed in the Examples. Accordingly, the order parameters of the optically anisotropic layers formed in the Examples were assumed to be equivalent to the measured order parameters of the optically anisotropic layers containing the dichroic dye.

Adhesion of Retardation Film

The adhesion between the retardation layer and the intermediate layer of each retardation film was examined by a cross-cut peel test. A cutter was used to make a grid of 100 squares having a size of 2 mm×2 mm. An adhesive tape (available from Nitto Denko Corporation) was applied onto the film and was then removed. The number of squares remaining on the film was rated according to the following criteria, where a larger number of squares indicates higher adhesion.

A: no square removed
B: 60 to less than 100 squares remaining
C: less than 60 squares remaining Storage Stability of Retardation Film in Hot and Humid Environments An accelerated test was performed by dipping each retardation film in hot water at 60° C. for 5 hours and then rubbing the liquid crystal material of the film with itself in the hot water to determine whether it peeled.

A: peeled
C: not peeled

Evaluation of Front Contrast (CR)

A backlight was attached to each IPS liquid crystal display fabricated as described above, and the display was examined for the luminances in a black display mode and a white display mode with a measuring instrument (EZ-Contrast XL88 from ELDIM, Inc.). The front contrast (CR) was calculated from the measurements and was rated according to the following criteria. Grades of C or higher are practical.

A: 900≤CR
B: 850≤CR<900
C: 800≤CR<850
D: 800>CR

Unevenness in Visual Appearance

The resulting films were each visually inspected for unevenness on an X-ray film illuminator in a cross nicol state.

AA: no unevenness
A: substantially no unevenness
B: slight and practically acceptable unevenness
C: clearly visible unevenness Viewing Angle Luminance and Color Evaluation of Color Shift (Color in Tilted Direction)

A backlight was attached to each IPS liquid crystal display fabricated as described above, and the display was examined for color shift in a black display mode with a measuring instrument (EZ-Contrast XL88 from ELDIM, Inc.). The color shift was defined as the average of the maximum ΔE measured at an azimuth angle of 60° from the front direction and at polar angles of 0° to 90° (first quadrant), 90° to 180° (second quadrant), 180° to 270° (third quadrant), and 270° to 360° (fourth quadrant). The color shift was rated according to the following criteria. Grades of C or higher are practical.

AA: significantly little color shift
A: little color shift
B: slight color shift
C: practically acceptable color shift
D: practically unacceptable color shift Evaluation of Viewing Angle CR (CR in Tilted Direction)

A backlight was attached to each IPS liquid crystal display fabricated as described above, and the display was examined for the luminances in a black display mode and a white display mode in a dark room with a measuring instrument (EZ-Contrast XL88 from ELDIM, Inc.). The viewing angle contrast ratio (viewing angle CR) was defined as the average of the minimum luminances measured at an azimuth angle of 60° in all the quadrants. The viewing angle CR was calculated and rated according to the following criteria. Grades of B or higher are practical.

A: viewing angle CR of 100 or more, practical
B: viewing angle CR of 70 to less than 100, substantially practical
C: viewing angle CR of 50 to less than 70, slightly impractical
D: viewing angle CR of less than 50, impractical Comprehensive Evaluation The resulting films were each mounted on an iPad from Apple Inc. The iPad was operated in a black display mode and was visually rated for unevenness in appearance, color variation, and black luminance.

A: excellent appearance, with no unevenness, and invariant black display at different viewing angles
B: good appearance with negligible unevenness and color variation
C: fair appearance with noticeable but commercially acceptable unevenness and color variation
D: noticeable and commercially unacceptable unevenness and color variation

TABLE 4

|  | First optically anisotropic layer | | | | | | | Intermediate layer | | |
| --- | --- | --- | --- | --- | --- | --- | --- | --- | --- | --- |
|  | liquid crystal compounds | leveling agent | OP | thickness | Re | Nz | ΔRe | type of alignment film | SP value | thickness |
| Comp. Exam. 1 | α | no | 0.88 | 1.2 | 130 | 0.99 | normal | PVA | 26.4 | 0.5 |
| Comp. Exam. 3 | α | no | 0.88 | 1.2 | 130 | 0.99 | normal | PVA | 26.4 | 4 |
| Comp. Exam. 3 | β | no | 0.7 | 1.3 | 130 | 1.01 | normal | acrylic 1 | 21.8 | 0.5 |
| Comp. Exam. 4 | α | A | 0.88 | 1.2 | 130 | 0.99 | normal | PVA | 26.4 | 0.5 |
| Example 1 | α | B | 0.88 | 1.2 | 130 | 0.99 | normal | acrylic 1 | 21.8 | 2.1 |
| Example 2 | α | A | 0.88 | 1.2 | 130 | 0.99 | normal | acrylic 1 | 21.8 | 0.5 |
| Comp. Exam. 5 | α | no | 0.88 | 1.2 | 130 | 0.99 | normal | no |  | 0 |
| Comp. Exam. 6 | α | no | 0.88 | 0.2 | 130 | 0.99 | normal | acrylic 1 | 21.8 | 0.5 |
| Comp. Exam. 7 | α | no | 0.88 | 3.1 | 130 | 0.99 | normal | acrylic 1 | 21.8 | 0.5 |
| Comp. Exam. 8 | α | A | 0.88 | 1.2 | 130 | 0.99 | normal | acrylic 1 | 21.8 | 0.5 |
| Comp. Exam. 9 | α | A | 0.88 | 1.2 | 130 | 0.99 | normal | acrylic 1 | 21.8 | 0.5 |
| Comp. Exam. 10 | α | no | 0.88 | 3.1 | 130 | 0.99 | normal | acrylic 1 | 21.8 | 0.5 |
| Example 3 | α | A | 0.88 | 1.2 | 130 | 0.99 | normal | acrylic 1 | 21.8 | 0.1 |
| Example 4 | α | A | 0.88 | 1.2 | 130 | 0.99 | normal | acrylic 1 | 21.8 | 2.1 |
| Example 5 | α | A | 0.88 | 1.2 | 130 | 0.99 | normal | acrylic 2 | 24.5 | 2.1 |
| Comp. Exam. 11 | α | A | 0.88 | 1.2 | 130 | 0.99 | normal | acrylic 3 | 25.0 | 2.1 |

TABLE 4-continued

| | | | | | | | | | | |
|---|---|---|---|---|---|---|---|---|---|---|
| Comp. Exam. 12 | α | A | 0.88 | 1.2 | 130 | 0.99 | normal | acrylic 4 | 21.1 | 2.1 |
| Comp. Exam. 13 | α | A | 0.88 | 1.2 | 130 | 0.99 | normal | alignment film5 | 25.1 | 2.1 |
| Example 6 | α | A | 0.88 | 1.2 | 130 | 0.99 | normal | acrylic 6 | 23.5 | 2.1 |
| Example 7 | ε | A | 0.76 | 1.2 | 140 | 0.99 | reverse | acrylic 1 | 21.8 | 2.1 |
| Example 8 | α | B | 0.88 | 1.2 | 130 | 0.99 | normal | acrylic 1 | 21.8 | 2.1 |
| Ref. Exam. 1 | α | no | 0.88 | 1.5 | 165 | 0.99 | normal | acrylic 1 | 21.8 | 4 |

| | Second optically anisotropic layer | | | | | | Liquid crystal |
|---|---|---|---|---|---|---|---|
| | liquid crystal | OP | thickness | Re | Rth | Thickness of retardation film | display |
| Comp. Exam. 1 | α | 0.7 | 1.3 | 1 | −100 | 3 | A |
| Comp. Exam. 3 | α | 0.7 | 1.3 | 1 | −99 | 6.5 | A |
| Comp. Exam. 3 | α | 0.7 | 1.3 | 1 | −101 | 3.1 | A |
| Comp. Exam. 4 | α | 0.7 | 1.3 | 1 | −100 | 3 | A |
| Example 1 | α | 0.7 | 1.3 | 2 | −101 | 3 | B |
| Example 2 | α | 0.7 | 1.3 | 2 | −101 | 3 | A |
| Comp. Exam. 5 | α | 0.7 | 1.3 | 1 | −100 | 2.5 | A |
| Comp. Exam. 6 | α | 0.7 | 1.3 | 2 | −101 | 3 | A |
| Comp. Exam. 7 | α | 0.7 | 1.3 | 2 | −101 | 3 | A |
| Comp. Exam. 8 | α | 0.7 | 0.2 | 2 | −101 | 3 | A |
| Comp. Exam. 9 | α | 0.7 | 3.1 | 2 | −101 | 3 | A |
| Comp. Exam. 10 | γ | 0.58 | 1.3 | 2 | −101 | 3 | A |
| Example 3 | α | 0.7 | 1.3 | 2 | −101 | 3 | A |
| Example 4 | α | 0.7 | 1.3 | 2 | −101 | 3 | A |
| Example 5 | α | 0.7 | 1.3 | 2 | −101 | 3 | A |
| Comp. Exam. 11 | α | 0.7 | 1.3 | 4 | −84 | 3 | A |
| Comp. Exam. 12 | α | 0.7 | 1.3 | 4 | −87 | 3 | A |
| Comp. Exam. 13 | α | 0.7 | 1.3 | * | | 3 | A |
| Example 6 | α | 0.7 | 1.3 | 2 | −101 | 3 | A |
| Example 7 | α | 0.7 | 1.3 | 2 | −101 | 3 | A |
| Example 8 | α | 0.7 | 1.3 | 2 | −101 | 3 | A |
| Ref. Exam. 1 | α | 0.7 | 1.3 | 0.9 | −90 | 6.8 | A |

* The sample could not be measured.

TABLE 5

| | Low degree of polarization of retardation film | High adhesion of retardation film | High storage stability in hot and humid environments of retardation film | Display performance | | | Comprehensive evaluation |
|---|---|---|---|---|---|---|---|
| | | | | CR | Unevenness in visual appearance | Viewing angle luminance and color | |
| Comp. Exam. 1 | C | A | C | C | C | B | C |
| Comp. Exam. 2 | B | A | C | B | B | A | C |
| Comp. Exam. 3 | C | A | A | C | B | A | C |
| Comp. Exam. 4 | B | C | C | B | B | A | C |
| Exam. 1 | A | A | A | A | AA | AA | A |
| Exam. 2 | A | A | A | A | A | A | A |
| Comp. Exam. 5 | C | A | C | C | B | A | C |
| Comp. Exam. 6 | A | A | A | B | B | C | C |
| Comp. Exam. 7 | A | A | A | B | B | C | C |
| Comp. Exam. 8 | A | A | A | B | B | C | C |
| Comp. Exam. 9 | A | A | A | B | B | C | C |
| Comp. Exam. 10 | C | A | A | C | A | A | C |
| Exam. 3 | A | A | A | B | B | A | B |
| Exam. 4 | A | A | A | B | B | A | B |
| Exam. 5 | A | A | A | B | B | A | B |
| Comp. Exam. 11 | B | C | A | C | B | B | C |
| Comp. Exam. 12 | B | C | C | C | B | B | C |
| Comp. Exam. 13 | | | the sample could not be evaluated for not aligned | | | | |
| Exam. 6 | A | B | A | B | B | A | B |
| Exam. 7 | A | A | A | A | A | A | A |
| Exam. 8 | A | A | A | A | AA | A | A |
| Ref. Exam. 14 | B | C | A | A | C | B | C |

In these tables, "OP" indicates the order parameter. The thickness is expressed in μm. Re indicates the retardation in a plane at a wavelength of 550 nm. Rth indicates the retardation across the thickness at a wavelength of 550 nm. Nz indicates (nx−nz)/(nx−ny). nx indicates the refractive index in the slow axis direction in a plane. ny indicates the refractive index in a direction perpendicular to nx in a plane. nz indicates the refractive index in a direction perpendicular to nx and ny. "Normal" in the ΔRe column indicates normal wavelength dispersion (Re(450)/Re(650)≥1), and "Reverse" indicates reverse wavelength dispersion (Re(450)/Re(650)<1).

The retardation films including an intermediate layer having an SP value outside the scope of the present invention (Comparative Examples 1, 2, 4, and 11 to 13) had low storage stability in hot and humid environments. The retardation films including an intermediate layer having a thickness larger than that within the scope of the present invention (Comparative Example 2 and Reference Example 1) had low storage stability in hot and humid environments or low adhesion.

The retardation films including a first or second optically anisotropic layer having an order parameter outside the scope of the present invention (Comparative Examples 3 and 10) and the retardation film including no intermediate layer (Comparative Example 5) had low contrast.

The retardation films including a first or second optically anisotropic layer having a thickness outside the scope of the present invention (Comparative Examples 6 to 9) had low viewing angle luminance and color.

In contrast, the retardation films of Examples 1 to 8 all had a low degree of depolarization, high adhesion, high storage stability in hot and humid environments, and high display performance.

EXPLANATION OF THE LETTERING

1: alignment film
2: protective film
3: retardation film
4: first optically anisotropic layer
5: second optically anisotropic layer
6: support for the retardation film
7: alignment film
8: hard coat layer
9: liquid crystal cell
10: rear polarizing plate
11: rear polarizing film
12: protective film for the rear polarizing film
13: alignment film
14: optically anisotropic layer
15: intermediate layer The present disclosure relates to the subject matter contained in Japanese Patent Application No. 154641/2013, filed on Jul. 25, 2013, and Japanese Patent Application No. 109781/2014, filed on May 28, 2014, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A retardation film comprising, in sequence;
    a first optically anisotropic layer comprising liquid crystal compounds fixed in a homogeneously aligned state and a leveling agent, the first optically anisotropic layer having an order parameter of 0.75 to 0.95 and having a thickness of 0.3 to 3.0 μm;
    an intermediate layer comprising a resin having an SP value of 21.5 to 24.7, where the SP value is a solubility parameter calculated by Hoy's method, the intermediate layer having a thickness of 3.0 μm or less; and
    a second optically anisotropic layer comprising liquid crystal compounds fixed in a homeotropically aligned state, the second optically anisotropic layer having an order parameter of 0.6 to 0.95 and having a thickness of 0.3 to 3.0 μm,
    wherein the order parameter OP is represented by the following equation;

$$OP=(A_{\parallel}-A_{\perp})/(2A_{\perp}+A_{\parallel})$$

where $A_{\parallel}$ is absorbance of the liquid crystal compounds for light polarized parallel to an alignment direction, and $A_{\perp}$ is absorbance of the liquid crystal compounds for light polarized perpendicular to the alignment direction;
    wherein the first optically anisotropic layer, the intermediate layer and the second optically anisotropic layer are adjacent to each other; and
    wherein at least one of the resin having an SP value of 21.5 to 24.7 is a (meth)acrylic resin and the (meth)acrylic resin has a hydroxyl group as a polar group.

2. The retardation film according to claim 1, wherein the resin having an SP value of 21.5 to 24.7 is the (meth)acrylic resin further comprising a polymerizable group.

3. The retardation film according to claim 1, wherein the leveling agent has a molecular weight of 500 to 2,000.

4. The retardation film according to claim 1, wherein the leveling agent comprises fluorine and/or silicon.

5. The retardation film according to claim 1, wherein the first optically anisotropic layer exhibits a smectic phase.

6. The retardation film according to claim 1, wherein the second optically anisotropic layer exhibits a nematic phase.

7. The retardation film according to claim 1, wherein the first optically anisotropic layer satisfies inequalities (1) and (2);

$$100\ nm \leq Re(550) \leq 200\ nm \quad (1)$$

$$0.8\ nm \leq Nz \leq 1.2\ nm \quad (2)$$

where Re(550) is the retardation in a plane at a wavelength of 550 nm, Nz is (nx−nz)/(nx−ny), nx is the refractive index in a slow axis direction in a plane, ny is the refractive index in a direction perpendicular to nx in a plane, and nz is the refractive index in a direction perpendicular to nx and ny.

8. The retardation film according to claim 1, wherein the first optically anisotropic layer satisfies inequality (3);

$$Re(450)/Re(650)<1$$

where Re(450) is the retardation in a plane at a wavelength of 450 nm, and Re(650) is the retardation in a plane at a wavelength of 650 nm.

9. The retardation film according to claim 1, wherein the second optically anisotropic layer further comprises a vertical alignment agent.

10. The retardation film according to claim 1, which has a thickness of 0.6 to 10 μm.

11. The retardation film according to claim 1, wherein each of the liquid crystal compounds contained in the first and second optically anisotropic layers is a rod-like liquid crystal compound.

12. The retardation film according to claim 1, further comprising;
a support; and
an alignment film,
wherein the alignment film, the first optically anisotropic layer, the intermediate layer, and the second optically anisotropic layer, are disposed in sequence on the support.

13. A polarizing plate comprising;
a polarizing film; and
the retardation film according to claim 1.

14. The polarizing plate according to claim 13, wherein the first optically anisotropic layer is disposed on the surface of the polarizing film.

15. A liquid crystal display comprising the retardation film according to claim 1 or the polarizing plate according to claim 13.

16. The liquid crystal display according to claim 15, wherein the liquid crystal display is an in-plane-switching (IPS) mode liquid crystal display.

17. The liquid crystal display according to claim 15, wherein the liquid crystal display comprises a polarizing plate comprising a polarizing film and the retardation film according to claim 1; and the polarizing plate disposed in the front of the liquid crystal display.

18. The liquid crystal display according to claim 17, further comprising;
a rear polarizing film;
a liquid crystal cell; and
a rear optical film disposed between the rear polarizing film and the liquid crystal cell, the rear optical film having a retardation Re(550) in a plane at a wavelength of 550 nm of 30 to 120 nm and a retardation Rth(550) across the thickness at a wavelength of 550 nm of 20 to 100 nm.

19. The liquid crystal display according to claim 18, wherein the rear optical film comprises an optically anisotropic layer comprising an obliquely aligned liquid crystal compound.

* * * * *